US012353024B2

(12) United States Patent
Dannoux et al.

(10) Patent No.: US 12,353,024 B2
(45) Date of Patent: Jul. 8, 2025

(54) MULTIPORTS AND OPTICAL CONNECTORS WITH ROTATIONALLY DISCRETE LOCKING AND KEYING FEATURES

(71) Applicant: CORNING RESEARCH & DEVELOPMENT CORPORATION, Corning, NY (US)

(72) Inventors: Thierry Luc Alain Dannoux, Avon (FR); Joel Christopher Rosson, Hickory, NC (US); Felice Scotta, Savingny le Temple (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/221,352

(22) Filed: Jul. 12, 2023

(65) Prior Publication Data

US 2023/0358968 A1    Nov. 9, 2023

Related U.S. Application Data

(63) Continuation of application No. 17/072,545, filed on Oct. 16, 2020, now Pat. No. 11,703,646, which is a
(Continued)

(51) Int. Cl.
*G02B 6/38*    (2006.01)
*G02B 6/42*    (2006.01)
*G02B 6/44*    (2006.01)

(52) U.S. Cl.
CPC ......... *G02B 6/3879* (2013.01); *G02B 6/3825* (2013.01); *G02B 6/3826* (2013.01);
(Continued)

(58) Field of Classification Search
CPC .................................................. G02B 6/3879
See application file for complete search history.

(56) References Cited

U.S. PATENT DOCUMENTS 3,074,107 A    1/1963  Kiyoshi et al.
3,532,783 A    10/1970 Pusey et al.
(Continued)

FOREIGN PATENT DOCUMENTS

AU    2006232206 A1    10/2006
CN    1060911 A    5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Eric Wong
(74) *Attorney, Agent, or Firm* — Michael E. Carroll, Jr.

(57) ABSTRACT

Fiber optic connectors and connectorized fiber optic cables include connector housings having locking portions defined on the connector housing that allow the connector housing to be selectively coupled to a corresponding push-button securing member of a multiport assembly. Methods for selectively connecting a fiber optic connector to, and disconnecting the fiber optic connector from the multiport assemblies allow for connector housings to be forcibly and nondestructively removed from the multiport assembly.

26 Claims, 26 Drawing Sheets

Related U.S. Application Data continuation of application No. 16/516,551, filed on Jul. 19, 2019, now Pat. No. 10,809,463, which is a continuation of application No. 16/018,988, filed on Jun. 26, 2018, now Pat. No. 10,359,577, which is a continuation-in-part of application No. PCT/US2017/064072, filed on Nov. 30, 2017.

(60) Provisional application No. 62/526,018, filed on Jun. 28, 2017, provisional application No. 62/526,195, filed on Jun. 28, 2017, provisional application No. 62/526,011, filed on Jun. 28, 2017.

(52) U.S. Cl.
CPC ......... *G02B 6/3831* (2013.01); *G02B 6/3851* (2013.01); *G02B 6/3869* (2013.01); *G02B 6/387* (2013.01); *G02B 6/3873* (2013.01); *G02B 6/3885* (2013.01); *G02B 6/381* (2013.01); *G02B 6/3821* (2013.01); *G02B 6/3837* (2013.01); *G02B 6/3841* (2013.01); *G02B 6/3843* (2013.01); *G02B 6/3849* (2013.01); *G02B 6/3871* (2013.01); *G02B 6/3887* (2013.01); *G02B 6/3889* (2013.01); *G02B 6/389* (2013.01); *G02B 6/3893* (2013.01); *G02B 6/3895* (2013.01); *G02B 6/3897* (2013.01); *G02B 6/4262* (2013.01); *G02B 6/4401* (2013.01); *G02B 6/4446* (2013.01); *G02B 6/4471* (2013.01); *G02B 6/4472* (2013.01); *G02B 6/4477* (2013.01); *G02B 6/4479* (2013.01)

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,226,832 A | 7/1993 | Dejardin et al. |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,329,603 A | 7/1994 | Watanabe et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,390,272 A | 2/1995 | Repta et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,681 A | 7/1998 | Manning |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |

(56) References Cited

U.S. PATENT DOCUMENTS

| | | |
|---|---|---|
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,876,071 A | 3/1999 | Aldridge |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,269,214 B1 | 7/2001 | Naudin et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,304,698 B1 | 10/2001 | Morris |
| 6,305,849 B1 | 10/2001 | Roehrs et al. |
| 6,321,013 B1 | 11/2001 | Hardwick et al. |
| 6,340,249 B1 | 1/2002 | Hayes et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Mazu et al. |
| 6,404,962 B1 | 6/2002 | Hardwick et al. |
| 6,409,391 B1 | 6/2002 | Chang |
| D460,043 S | 7/2002 | Fan Wong |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,443,626 B1 | 9/2002 | Foster |
| 6,466,725 B2 | 10/2002 | Battey et al. |
| 6,487,344 B1 | 11/2002 | Naudin et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,001,081 B2 | 2/2006 | Cox et al. |
| 7,011,454 B2 | 3/2006 | Caveney et al. |
| 7,013,074 B2 | 3/2006 | Battey et al. |
| 7,025,507 B2 | 4/2006 | De Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,085,468 B2 | 8/2006 | Forrester |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |

(56) References Cited

U.S. PATENT DOCUMENTS

| | | |
|---|---|---|
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,579 B2 | 4/2008 | Feldner |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| D574,775 S | 8/2008 | Amidon |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 | 8/2009 | Jones et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,641,398 B2 | 1/2010 | O'Riorden et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,812 B2 | 3/2010 | Castagna et al. |
| 7,677,814 B2 | 3/2010 | Lu et al. |
| 7,680,388 B2 | 3/2010 | Reagan et al. |
| 7,695,197 B2 | 4/2010 | Gurreri |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| RE41,743 E | 9/2010 | Naudin et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,811,006 B2 | 10/2010 | Milette et al. |
| 7,820,090 B2 | 10/2010 | Morrow et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,002,566 B1 | 8/2011 | Baumann et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |

(56) References Cited

U.S. PATENT DOCUMENTS

| | | |
|---|---|---|
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,634,688 B2 | 1/2014 | Bryon et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,768,133 B2 | 7/2014 | Bryon et al. |
| 8,770,861 B2 | 7/2014 | Smith et al. |
| 8,770,862 B2 | 7/2014 | Lu et al. |
| D711,320 S | 8/2014 | Yang et al. |
| 8,798,430 B2 | 8/2014 | Bryon et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,944,703 B2 | 2/2015 | Song et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,081,154 B2 | 7/2015 | Zimmel et al. |
| 9,146,364 B2 | 9/2015 | Chen et al. |
| D741,803 S | 10/2015 | Davidson, Jr. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Power et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,429,732 B2 | 8/2016 | Ahmed et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| D783,618 S | 4/2017 | Wu et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,224 B2 | 3/2018 | Liu et al. |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 9,989,711 B2 | 6/2018 | Ott et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,061,091 B2 | 8/2018 | Kempeneers et al. |
| 10,073,224 B2 | 9/2018 | Tong et al. |

(56) References Cited

U.S. PATENT DOCUMENTS

| | | |
|---|---|---|
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,288,821 B2 | 5/2019 | Isenhour |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,379,308 B2 | 8/2019 | Coate |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,545,298 B2 | 1/2020 | Bauco et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| D880,423 S | 4/2020 | Obata et al. |
| 10,613,278 B2 | 4/2020 | Kempeneers et al. |
| 10,620,388 B2 | 4/2020 | Isenhour et al. |
| 10,641,967 B1 | 5/2020 | Cote et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,768,382 B2 | 9/2020 | Cote et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,921,530 B2 | 2/2021 | Wong et al. |
| 10,921,531 B2 | 2/2021 | Wong et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,073,664 B2 | 7/2021 | Chang et al. |
| 11,105,986 B2 | 8/2021 | Coenegracht et al. |
| 11,112,567 B2 | 9/2021 | Higley et al. |
| 11,161,603 B2 | 11/2021 | Vallart et al. |
| 11,262,509 B2 | 3/2022 | Rosson |
| 11,290,188 B2 | 3/2022 | Tuccio et al. |
| 11,487,073 B2 | 11/2022 | Ripumaree et al. |
| 11,493,700 B2 | 11/2022 | Rosson |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2002/0181893 A1 | 12/2002 | White et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2005/0213899 A1 | 9/2005 | Hurley et al. |

(56) References Cited

U.S. PATENT DOCUMENTS

| | | |
|---|---|---|
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Ail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0025670 A1 | 1/2008 | Castagna et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0142228 A1 | 6/2008 | Harvey et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175546 A1 | 7/2008 | Lu et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2008/0310796 A1 | 12/2008 | Lu |
| 2008/0317415 A1 | 12/2008 | Hendrickson et al. |
| 2009/0003772 A1 | 1/2009 | Lu et al. |
| 2009/0003777 A1 | 1/2009 | Feldner |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0136184 A1 | 5/2009 | Abernathy et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |

(56) References Cited

U.S. PATENT DOCUMENTS

| | | |
|---|---|---|
| 2010/0290741 A1 | 11/2010 | Lu et al. |
| 2010/0303416 A1 | 12/2010 | Danley et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0033157 A1 | 2/2011 | Drouard |
| 2011/0044588 A1 | 2/2011 | Larson et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123157 A1 | 5/2011 | Belsan et al. |
| 2011/0123166 A1 | 5/2011 | Reagan et al. |
| 2011/0129185 A1 | 6/2011 | Lewallen et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0229098 A1 | 9/2011 | Abernathy et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0257858 A1 | 10/2012 | Nhep |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0022317 A1 | 1/2013 | Norris et al. |
| 2013/0034333 A1 | 2/2013 | Holmberg et al. |
| 2013/0051734 A1 | 2/2013 | Shen et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0029897 A1 | 1/2014 | Shimazu et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0115545 A1 | 4/2015 | Kempeneers et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0270626 A1 | 9/2015 | Bishop |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0018605 A1 | 1/2016 | Ott et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0209605 A1 | 7/2016 | Lu et al. |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2017/0018875 A1 | 1/2017 | Bauer et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |

(56) References Cited

U.S. PATENT DOCUMENTS

| | | |
|---|---|---|
| 2017/0212313 A1 | 7/2017 | Elenabaas et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0003902 A1 | 1/2018 | Rosson et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267243 A1 | 9/2018 | Nhep et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0339475 A1 | 11/2019 | Takano et al. |
| 2019/0361177 A1 | 11/2019 | Aoshima et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0003963 A1 | 1/2020 | Iizumi et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116955 A1 | 4/2020 | Ho et al. |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0132941 A1 | 4/2020 | Otsuka et al. |
| 2020/0150356 A1 | 5/2020 | Lu |
| 2020/0174201 A1 | 6/2020 | Cote et al. |
| 2020/0174214 A1 | 6/2020 | Alves et al. |
| 2020/0183097 A1 | 6/2020 | Chang et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0301090 A1 | 9/2020 | Petersen et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0132302 A1 | 5/2021 | Wong et al. |
| 2021/0149124 A1 | 5/2021 | Higley et al. |
| 2021/0149140 A1 | 5/2021 | Jensen |
| 2021/0278607 A1 | 9/2021 | Cote et al. |
| 2021/0278687 A1 | 9/2021 | Tsuchiya |
| 2021/0318499 A1 | 10/2021 | Cote et al. |
| 2022/0236497 A1 | 7/2022 | Calvin et al. |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105492946 A | 4/2016 |
| CN | 105683795 A | 6/2016 |
| CN | 106716205 A | 5/2017 |
| CN | 106873086 A | 6/2017 |

(56) References Cited

FOREIGN PATENT DOCUMENTS

| | | | |
|---|---|---|---|
| CN | 110608208 A | 12/2019 | |
| CN | 110954996 A | 4/2020 | |
| DE | 3537684 A1 | 4/1987 | |
| DE | 3737842 C1 | 9/1988 | |
| DE | 19805554 A1 | 8/1998 | |
| EP | 0012566 A1 | 6/1980 | |
| EP | 0026553 A1 | 4/1981 | |
| EP | 0122566 A2 | 10/1984 | |
| EP | 0130513 A2 | 1/1985 | |
| EP | 0244791 A2 | 11/1987 | |
| EP | 0462362 A2 | 12/1991 | |
| EP | 0468671 A1 | 1/1992 | |
| EP | 0469671 A1 | 2/1992 | |
| EP | 0547778 A1 | 6/1993 | |
| EP | 0547788 A1 | 6/1993 | |
| EP | 0762171 A1 | 3/1997 | |
| EP | 0782025 A1 | 7/1997 | |
| EP | 0855610 A2 | 7/1998 | |
| EP | 0856751 A1 | 8/1998 | |
| EP | 0856761 A1 | 8/1998 | |
| EP | 0940700 A2 | 9/1999 | |
| EP | 0949522 A2 | 10/1999 | |
| EP | 0957381 A1 | 11/1999 | |
| EP | 0978746 A1 | 2/2000 | |
| EP | 0997757 A2 | 5/2000 | |
| EP | 1065542 A1 | 1/2001 | |
| EP | 1122566 A2 | 8/2001 | |
| EP | 1243957 A2 | 9/2002 | |
| EP | 1258758 A2 | 11/2002 | |
| EP | 1391762 A1 | 2/2004 | |
| EP | 1431786 A2 | 6/2004 | |
| EP | 1438622 A2 | 7/2004 | |
| EP | 1678537 A1 | 7/2006 | |
| EP | 1759231 A1 | 3/2007 | |
| EP | 1810062 A1 | 7/2007 | |
| EP | 2069845 A2 | 6/2009 | |
| EP | 2149063 A1 | 2/2010 | |
| EP | 2150847 A1 | 2/2010 | |
| EP | 2193395 A1 | 6/2010 | |
| EP | 2255233 A1 | 12/2010 | |
| EP | 2333597 A2 | 6/2011 | |
| EP | 2362253 A1 | 8/2011 | |
| EP | 2401641 A1 | 1/2012 | |
| EP | 2609458 A1 | 7/2013 | |
| EP | 2622395 A1 | 8/2013 | |
| EP | 2734879 A1 | 5/2014 | |
| EP | 2815259 A1 | 12/2014 | |
| EP | 2817667 A1 | 12/2014 | |
| EP | 2992372 A1 | 3/2016 | |
| EP | 3022596 A1 | 5/2016 | |
| EP | 3064973 A2 | 9/2016 | |
| EP | 3101740 A1 | 12/2016 | |
| EP | 3207223 A1 | 8/2017 | |
| EP | 3234672 A1 | 10/2017 | |
| EP | 3245545 A1 | 11/2017 | |
| EP | 3265859 A1 | 1/2018 | |
| EP | 3336992 A1 | 6/2018 | |
| EP | 3362830 A1 | 8/2018 | |
| EP | 3427096 A1 | 1/2019 | |
| EP | 3443395 A1 | 2/2019 | |
| EP | 3535614 A1 | 9/2019 | |
| EP | 3537197 A1 | 9/2019 | |
| EP | 3646074 A1 | 5/2020 | |
| EP | 3646079 A1 | 5/2020 | |
| EP | 3403125 B1 | 7/2021 | |
| ES | 1184287 U | 5/2017 | |
| FR | 2485754 A1 | 12/1981 | |
| GB | 2022284 | 12/1979 | |
| GB | 2154333 A | 9/1985 | |
| GB | 2169094 A | 7/1986 | |
| JP | 52-030447 A | 3/1977 | |
| JP | 58-142308 A | 8/1983 | |
| JP | 61-145509 A | 7/1986 | |
| JP | 62-054204 A | 3/1987 | |
| JP | 63-020111 A | 1/1988 | |
| JP | 63-078908 A | 4/1988 | |
| JP | 63-089421 A | 4/1988 | |
| JP | 03-063615 A | 3/1991 | |
| JP | 03-207223 A | 9/1991 | |
| JP | 05-106765 A | 4/1993 | |
| JP | 05-142439 A | 6/1993 | |
| JP | 05-297246 A | 11/1993 | |
| JP | 06-320111 A | 11/1994 | |
| JP | 07-318758 A | 12/1995 | |
| JP | 08-050211 A | 2/1996 | |
| JP | 08-054522 A | 2/1996 | |
| JP | 08-062432 A | 3/1996 | |
| JP | 08-292331 A | 11/1996 | |
| JP | 09-049942 A | 2/1997 | |
| JP | 09-135526 A | 5/1997 | |
| JP | 09-159867 A | 6/1997 | |
| JP | 09-203831 A | 8/1997 | |
| JP | 09-325223 A | 12/1997 | |
| JP | 09-325249 A | 12/1997 | |
| JP | 10-170781 A | 6/1998 | |
| JP | 10-332953 A | 12/1998 | |
| JP | 10-339826 A | 12/1998 | |
| JP | 11-064682 A | 3/1999 | |
| JP | 11-119064 A | 4/1999 | |
| JP | 11-248979 A | 9/1999 | |
| JP | 11-271582 A | 10/1999 | |
| JP | 11-281861 A | 10/1999 | |
| JP | 11-326693 A | 11/1999 | |
| JP | 11-337768 A | 12/1999 | |
| JP | 11-352368 A | 12/1999 | |
| JP | 2000-002828 A | 1/2000 | |
| JP | 2001-116968 A | 4/2001 | |
| JP | 2001-290051 A | 10/2001 | |
| JP | 2002-520987 A | 7/2002 | |
| JP | 3296698 B2 | 7/2002 | |
| JP | 2002-250987 A | 9/2002 | |
| JP | 2003-009331 A | 1/2003 | |
| JP | 2003-070143 A | 3/2003 | |
| JP | 2003-121699 A | 4/2003 | |
| JP | 2003-177279 A | 6/2003 | |
| JP | 2003-302561 A | 10/2003 | |
| JP | 2004-361521 A | 12/2004 | |
| JP | 2005-024789 A | 1/2005 | |
| JP | 2005-031544 A | 2/2005 | |
| JP | 2005-077591 A | 3/2005 | |
| JP | 2005-114860 A | 4/2005 | |
| JP | 2005-520987 A | 7/2005 | |
| JP | 2006-023502 A | 1/2006 | |
| JP | 2006-146084 A | 6/2006 | |
| JP | 2006-259631 A | 9/2006 | |
| JP | 2006-337637 A | 12/2006 | |
| JP | 2007-078740 A | 3/2007 | |
| JP | 2007-121859 A | 5/2007 | |
| JP | 2008-191422 A | 8/2008 | |
| JP | 2008-250360 A | 10/2008 | |
| JP | 2009-265208 A | 11/2009 | |
| JP | 2010-152084 A | 7/2010 | |
| JP | 2010-191420 A | 9/2010 | |
| JP | 2011-018003 A | 1/2011 | |
| JP | 2011-033698 A | 2/2011 | |
| JP | 2013-041089 A | 2/2013 | |
| JP | 2013-156580 A | 8/2013 | |
| JP | 2014-085474 A | 5/2014 | |
| JP | 2014-095834 A | 5/2014 | |
| JP | 2014-134746 A | 7/2014 | |
| JP | 5537852 B2 | 7/2014 | |
| JP | 5538328 B2 | 7/2014 | |
| JP | 2014-157214 A | 8/2014 | |
| JP | 2014-219441 A | 11/2014 | |
| JP | 2015-125217 A | 7/2015 | |
| JP | 2016-109816 A | 6/2016 | |
| JP | 2016-109817 A | 6/2016 | |
| JP | 2016-109819 A | 6/2016 | |
| JP | 2016-156916 A | 9/2016 | |
| JP | 3207223 U | 11/2016 | |
| JP | 3207233 U | 11/2016 | |
| KR | 10-2013-0081087 A | 7/2013 | |
| RU | 2402794 C1 | 10/2010 | |
| TW | 222688 B | 4/1994 | |

(56) References Cited

FOREIGN PATENT DOCUMENTS

| | | |
|---|---|---|
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2005/066674 A2 | 7/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/029072 A1 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/126411 A1 | 10/2009 |
| WO | 2009/148797 A1 | 12/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/074688 A2 | 6/2012 |
| WO | 2012/163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/009435 A1 | 1/2015 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/005789 A1 | 1/2019 |
| WO | 2019/006121 A1 | 1/2019 |
| WO | 2019/006176 A1 | 1/2019 |
| WO | 2019/006191 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |
| WO | 2020/242847 A1 | 12/2020 |
| WO | 2022/115271 A1 | 6/2022 |

OTHER PUBLICATIONS

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

CoolShirt fittings, https://www.amazon.com/Cool-Shirt-5014-0001-Release-Connectors/dp/B01LXBXYJ9, Sep. 23, 2016 (Year: 2016).

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

Corning Cable Systems, "SST-Drop (Dielectric) Cables 1-12 Fibers", Product Specifications, 2 pgs. (2002).

Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).

Faulkner et al. "Optical networks for local lopp applications," J. Lightwave Technol.0733-8724 7(11), 17411751 (1989).

Fiber Systems International: Fiber Optic Solutions, data, "TFOCA-11 4-Channel Fiber Optic Connector" sheet. 2003, 2 pgs.

Gold Plated Toslink. Date: Feb. 5, 2015. [online], [Site visited Mar. 2, 2021], Available from Internet URL: https://www.amazon.com/dp/B00T8HWV62/ (Year: 2015).

Infolite—Design and Data Specifications, 1 pg. Retrieved Feb. 21, 2019.

Liu et al., "Variable optical power splitters create new apps", Retrieved from: https://www.lightwaveonline.com/fttx/pon-systems/article/16648432/variable-optical-power-splitters-create-new-apps, 2005, 14 pages.

Nawata, "Multimode and Single-Mode Fiber Connectors Technology"; IEEE Journal of Quantum Electronics, vol. QE-16, No. 6 Published Jun. 1980.

Optical connector. (Design—(Copyrights) Questel) orbit.com. [Online PDF compilation of references selected by 3 [examiner] 20 pgs. Print Dates Range Mar. 9, 2003-May 25, 2015. [Retrieved Feb. 3, 2021] https://www.orbit.com/export/UCZAH96B/pdf4/81c7766a-d250-4555-a8f1-3bdf9dc 1 bd6c-185304.pdf (Year: 2021).

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Schneier, Bruce; "Applied Cryptography: Protocols, Algorithms, and Source Code in C," Book. 1995 SEC. 10.3, 12.2, 165 PGS.

Stratos: Lightwave., "Innovation Brought to Light", Hybrid HMA Series, Hybrid Multi Application, 2002, 2 pgs.

UPC Optic Fiber Quick Connector. Date: May 13, 2016 [online], [Site visited Mar. 2, 2021], Available from Internet URL: https://www.amazon.com/dp/B01FLUV5DE/ (Year: 2016).

Wang et al. "Opto-VLSI-based dynamic optical splitter," Electron. Lett.0013-5194 10.1049/el:20046715 40(22), F14451446 (2004).

Xiao et al. "1 xN wavelength selective adaptive optical power splitter for wavelength-division multiplexed passive optical networks," Optics & Laser Technology 68, pp. 160-164, May 2015.

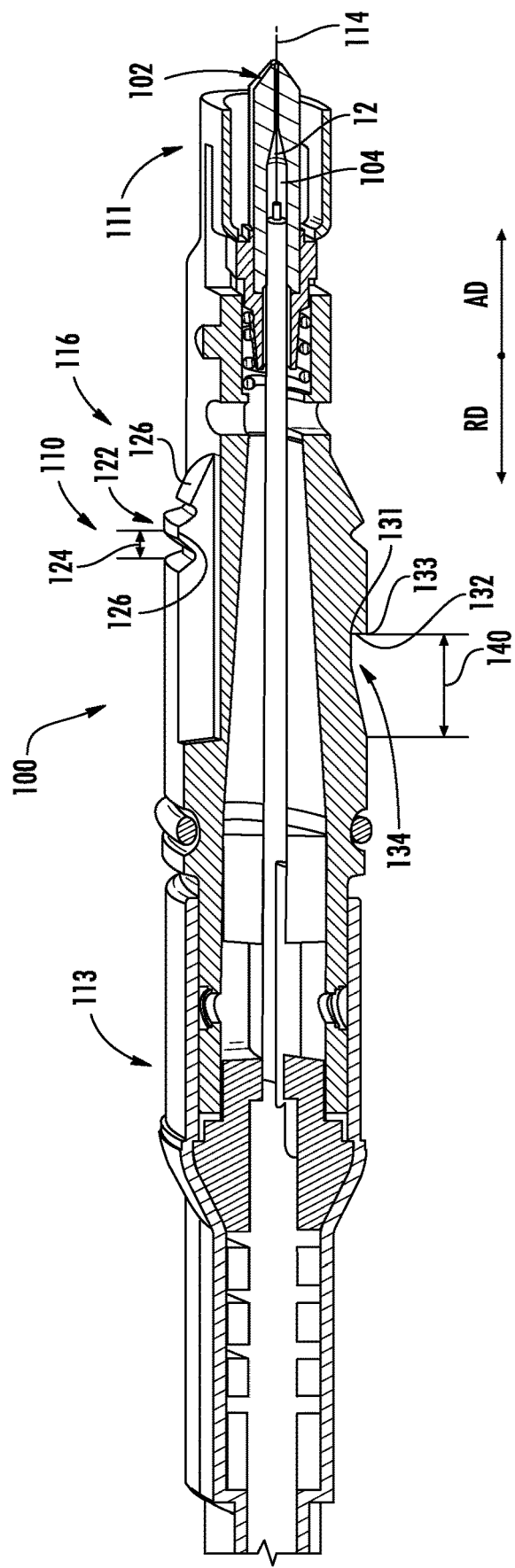
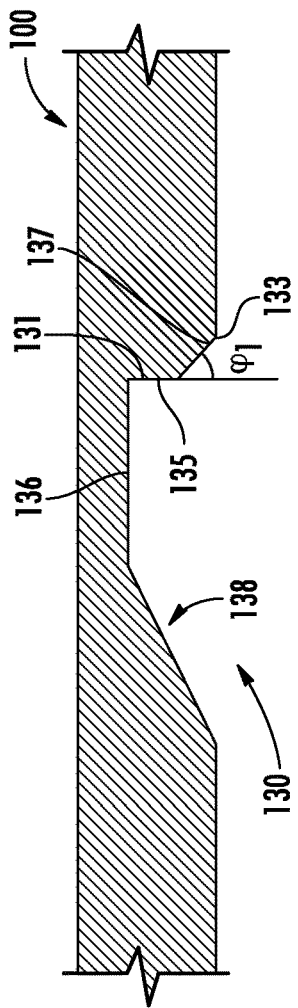
FIG. 3A
FIG. 3B

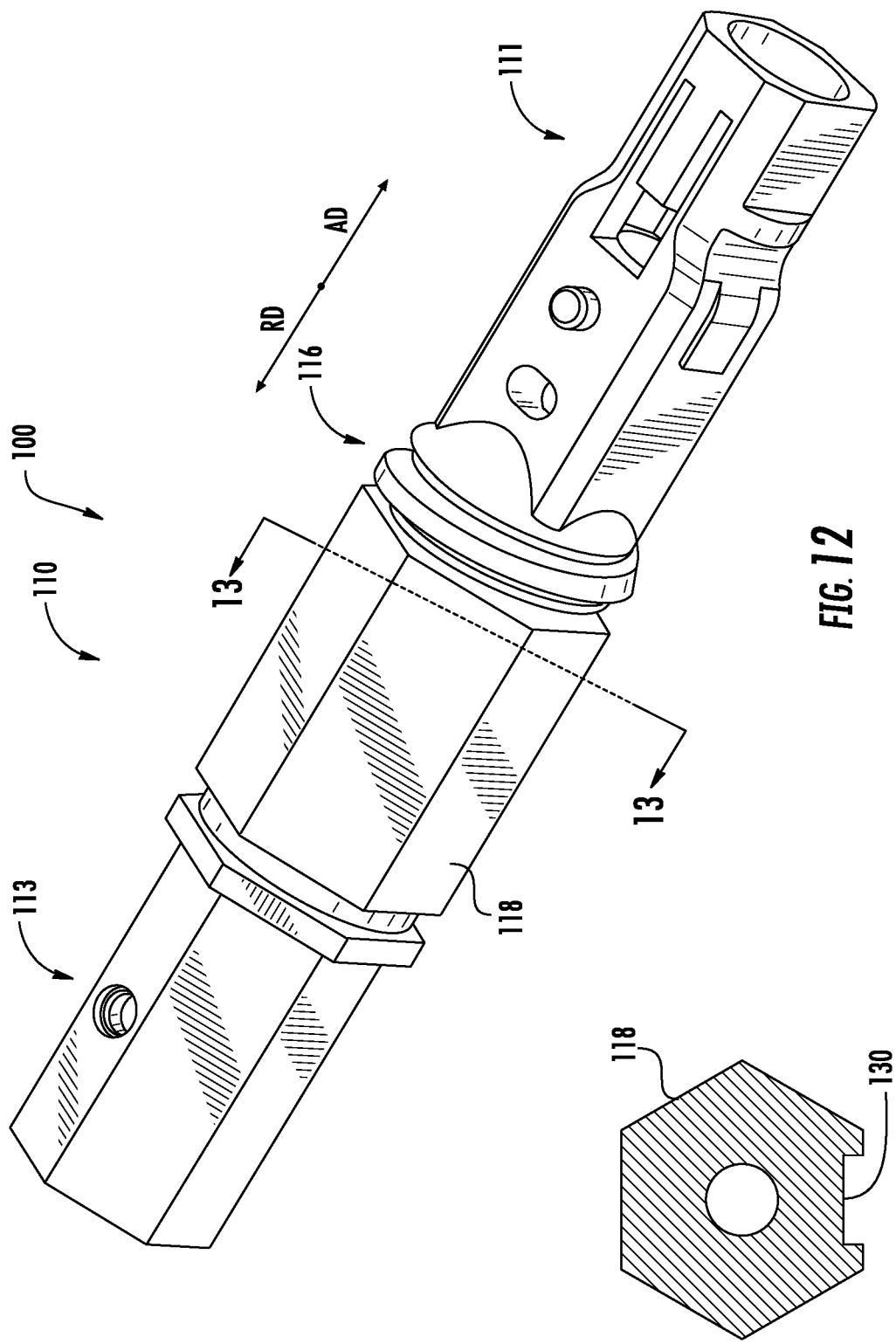

MULTIPORTS AND OPTICAL CONNECTORS WITH ROTATIONALLY DISCRETE LOCKING AND KEYING FEATURES

CROSS-REFERENCE TO RELATED APPLICATIONS

This application is a continuation of U.S. patent application Ser. No. 17/072,545 filed on Oct. 16, 2020, which is now U.S. Pat. No. 11,703,646 granted on Jul. 18, 2023, which is a continuation of U.S. patent application Ser. No. 16/516,551 filed on Jul. 19, 2019, which is now U.S. Pat. No. 10,809,463 granted on Oct. 20, 2020, which is a continuation of U.S. patent application Ser. No. 16/018,988 filed on Jun. 26, 2018, which is now U.S. Pat. No. 10,359,577 granted on Jul. 23, 2019, which is a continuation-in-part of PCT/US2017/064072 filed Nov. 30, 2017, and claims the benefit of U.S. Provisional Patent Application 62/526,011, filed on Jun. 28, 2017, U.S. Provisional Patent Application 62/526,018 filed on June 28, 2017, and U.S. Provisional Patent Application 62/526,195 filed on Jun. 28, 2017, the contents each of which are hereby incorporated by reference in their entirety.

BACKGROUND

Field

The present disclosure relates generally to assemblies for interconnecting or otherwise terminating optical fibers and fiber optic cables in a manner suitable for mating with corresponding optical receptacles.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc, all of which are available from Corning Incorporated, with similar products available from other manufacturers, as is well documented in the patent literature.

The optical receptacles with which the aforementioned terminated fibers and cables are coupled are commonly provided at optical network units (ONUS), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

BRIEF SUMMARY

Fiber optic connectors, connectorized cable assemblies, multiport assemblies, and methods for connecting fiber optic connectors to, and disconnecting fiber optic connectors from multiport assemblies are disclosed herein.

In one embodiment, a fiber optic connector includes a ferrule including an optical fiber bore and a connector housing, where the connector housing includes a ferrule retaining portion positioned at a front portion of the connector housing, the ferrule retaining portion structurally configured to engage and retain the ferrule, a longitudinal axis extending from the front portion of the connector housing, through the ferrule retaining portion to a rear portion of the connector housing positioned opposite the front portion, a nominal housing portion defined on an outer surface of the connector housing, and a locking portion defined on the outer surface of the connector housing and interrupting the nominal housing portion, where the locking portion includes a port engagement face that extends inward from the nominal housing portion of the connector housing toward the longitudinal axis and that is oriented transverse to the longitudinal axis, and the locking portion further includes a locking portion recess positioned rearward of the port engagement face and inward of the nominal housing portion of the connector housing, and the locking portion recess is oriented transverse to the port engagement face and includes a planar surface extending across at least a portion of the outer surface of the connector housing.

In another embodiment, a connectorized fiber optic cable includes a ferrule including an optical fiber bore and a connector housing including a ferrule retaining portion positioned at a front portion of the connector housing, the ferrule retaining portion engaged with the ferrule, a longitudinal axis extending from the front portion of the connector housing, through the ferrule retaining portion and the optical fiber bore of the ferrule to a rear portion of the connector housing positioned opposite the front portion, a nominal housing portion defined on an outer surface of the connector housing, and a locking portion defined on the outer surface of the connector housing and interrupting the nominal housing portion, where the locking portion includes a port engagement face that extends inward from the nominal housing portion of the connector housing toward the longitudinal axis and that is oriented transverse to the longitudinal axis, and the locking portion further includes a locking portion recess positioned rearward of the port engagement face and inward of the nominal housing portion of the connector housing, and the locking portion recess is oriented transverse to the port engagement face and includes a planar surface extending across at least a portion of the outer surface of the connector housing, and a fiber optic cable including an optical fiber extending along the longitudinal axis of the connector housing to the optical fiber bore of the ferrule.

In yet another embodiment, a multiport assembly includes a shell defining a cavity positioned within the shell, a plurality of optical adapters positioned within the cavity of the shell, the plurality of optical adapters structurally configured to receive, align, and optically couple dissimilar optical connectors, a plurality of optical connector ports including respective connection port passageways permitting external optical connectors to access the plurality of optical adapters positioned within the cavity of the shell, the connection port passageways including respective connector insertion paths, and a plurality of push-button securing members associated with respective ones of the connection port passageways, each push-button securing member of the plurality of push-button securing members including a bore extending through the push-button securing member, the bore defining an inner perimeter, a connector engagement face positioned on the bore and oriented transverse to a corresponding connector insertion path, the connector engagement face including an inner end and an outer end positioned outward of the inner end, and a ramp positioned on the bore, the ramp extending between the inner perimeter of the bore and the inner end of the connector engagement face.

In yet another embodiment, a fiber optic junction includes a multiport assembly includes a shell defining a cavity positioned within the shell, an optical adapter positioned within the cavity of the shell, the optical adapter structurally configured to receive, align, and optically couple dissimilar optical connectors, an optical connection port defined by the shell and in communication with the cavity, the optical connection port includes a connection port passageway extending into the cavity and defining a connector insertion path, and a push-button securing member that intersects the connection port passageway, the push-button securing member including a bore extending through the push-button securing member and defining an inner perimeter, and a connector engagement face extending inward from the inner perimeter of the bore, and a fiber optic connector positioned at least partially within the connector insertion path of the multiport assembly, the fiber optic connector including a connector housing including a ferrule retaining portion positioned at a front portion of the connector housing, the ferrule retaining portion structurally configured to engage and retain a ferrule, a longitudinal axis extending from the front portion of the connector housing, through the ferrule retaining portion to a rear portion of the connector housing positioned opposite the front portion, a nominal housing portion defined on an outer surface of the connector housing, and a locking portion defined on the outer surface of the connector housing and interrupting the nominal housing portion, where the locking portion includes a port engagement face that extends inward from the nominal housing portion of the connector housing toward the longitudinal axis and that is oriented transverse to the longitudinal axis, and the locking portion further includes a locking portion recess positioned rearward of the port engagement face and inward of the nominal housing portion of the connector housing, and the locking portion recess is oriented transverse to the port engagement face and includes a planar surface extending across at least a portion of the outer surface of the connector housing, and where the port engagement face is selectively engaged with the connector engagement face of the multiport assembly.

In yet another embodiment, a method for selectively connecting a fiber optic connector to a multiport assembly includes inserting a connector housing of a fiber optic connector into a connector port of a multiport assembly, the connector housing including a longitudinal axis extending through the connector housing, engaging a ramp of a push-button securing member of the multiport assembly with the connector housing, moving the push-button securing member away from a connector insertion path defined by the multiport assembly, moving at least a portion of the connector housing through a bore of the push-button securing member of the multiport assembly, moving at least a portion of the push-button securing member into a locking portion recess of the connector housing, and engaging a connector engagement face of the push-button securing member that is oriented transverse to the connector insertion path of the multiport assembly, with a port engagement face of the connector housing that is oriented transverse to the longitudinal axis of the connector housing to selectively couple the connector housing to the multiport assembly.

In yet another embodiment, a fiber optic connector includes a ferrule and a connector housing, where the ferrule includes an optical fiber bore and the connector housing includes a ferrule retaining portion structurally configured to engage and retain the ferrule at a front portion of the connector housing, a longitudinal axis extending from a leading edge plane of the front portion of the connector housing, through the ferrule retaining portion, to a rear portion of the connector housing, a nominal housing portion defined on an outer surface of the connector housing, a rotationally discrete keying portion defined on the outer surface of the connector housing, and a rotationally discrete locking portion defined on the outer surface of the connector housing, where the nominal housing portion is interrupted by the rotationally discrete keying portion and the rotationally discrete locking portion, the connector housing has an unobstructed line of sight from the rotationally discrete keying portion to the leading edge plane of the connector housing along an advancing direction of the fiber optic connector, the rotationally discrete keying portion includes at least one rotationally discrete contact surface that is structurally configured to inhibit rotation of the connector housing about the longitudinal axis when engaged with a complementary keying portion of an optical connector port, the rotationally discrete locking portion includes a rearwardly facing port engagement face and a locking portion recess that is positioned rearward of the port engagement face, the locking portion recess is obstructed from the leading edge plane of the connector housing along the advancing direction of the fiber optic connector by the port engagement face, and the port engagement face of the locking portion is structurally configured to inhibit axial movement of the connector housing along a retracting direction of the fiber optic connector when engaged with a complementary securing member of an optical connector port.

In yet another embodiment, a multiport assembly includes a shell defining a cavity positioned within the shell, a plurality of optical adapters positioned within the cavity of the shell, the optical adapters structurally configured to receive, align, and optically couple dissimilar optical connectors, a plurality of optical connector ports including respective connection port passageways permitting external optical connectors to access the plurality of optical adapters positioned within the cavity of the shell, the connection port passageways including corresponding connector insertion paths, a plurality of rotationally discrete keying portions associated with respective ones of the connection port passageways, where each keying portion includes at least one rotationally discrete contact surface in unobstructed line of sight with an open end of a respective connection port passageway and the at least one rotationally discrete contact surface is structurally configured to inhibit rotation of a connector housing residing in the respective connection port passageway, and a plurality of push-button securing members associated with respective ones of the connection port passageways, where each push-button securing member is biased in an engaged position, in which a rotationally discrete locking portion of the push-button securing member is positioned within the corresponding connector insertion path, and is selectively positionable into and out of a disengaged position, in which the rotationally discrete locking portion of the push-button securing member is positioned outside the corresponding connector insertion path, the rotationally discrete locking portion of each push-button securing member includes a ramp oriented to progressively constrict the corresponding connector insertion path along an advancing direction of a fiber optic connector in the respective connection port passageway and an locking portion recess obstructed from the open end of the respective connection port passageway by a connector engagement face of the rotationally discrete locking portion of the push-button securing member, and the connector engagement face of the rotationally discrete locking portion is structurally configured to inhibit axial movement of a fiber optic connector in the connection port passageway along a retracting direction of a fiber optic connector in the respective connection port passageway.

In yet another embodiment, a method for connecting a fiber optic connector to a multiport assembly includes providing a fiber optic connector including a ferrule and a connector housing, where the ferrule includes an optical fiber bore and the connector housing includes a ferrule retaining portion structurally configured to engage and retain the ferrule at a front portion of the connector housing, a longitudinal axis extending from a leading edge plane of the front portion of the connector housing, through the ferrule retaining portion to a rear portion of the connector housing, a nominal housing portion defined on an outer surface of the connector housing, a rotationally discrete keying portion defined on the outer surface of the connector housing, and a rotationally discrete locking portion defined on the outer surface of the connector housing, where the nominal housing portion is interrupted by the rotationally discrete keying portion and the locking portion, the rotationally discrete keying portion includes an unobstructed line of sight with the leading edge plane of the connector housing along an advancing direction of the fiber optic connector, the rotationally discrete keying portion including at least one rotationally discrete contact surface structurally configured to inhibit rotation of the connector housing about the longitudinal axis when engaged with a complementary keying portion of an optical connector port, the locking portion includes a rearwardly facing port engagement face and a locking portion recess that is positioned rearward of the port engagement face, the locking portion recess is obstructed from the leading edge plane of the connector housing along the advancing direction of the fiber optic connector by the port engagement face, and the port engagement face of the locking portion is structurally configured to inhibit axial movement of the connector housing along a retracting direction of the fiber optic connector when engaged with a complementary locking portion of an optical connector port, advancing the fiber optic connector along the advancing direction into an optical connector port of a multiport assembly including a plurality of optical adapters, the optical adapters structurally configured to receive, align, and optically couple the fiber optic connector with a dissimilar optical connector within the multiport assembly, aligning the rotationally discrete keying portion of the connector housing with a complementary rotationally discrete keying portion associated with the optical connector port to permit the rotationally discrete locking portion of the connector housing to engage a rotationally discrete locking portion of a push-button securing member associated with the optical connector port, and engaging the rotationally discrete locking portion of the connector housing with the rotationally discrete locking portion of the push-button securing member associated with the optical connector port.

In yet another embodiment, a connectorized fiber optic cable assembly includes a ferrule, a connector housing, a cable adapter, a fiber optic cable, and a type SC conversion housing, where the connector housing includes a ferrule retaining portion, an adapter seating portion, a longitudinal axis extending transversely from a leading edge plane of the front portion of the connector housing, through the ferrule retaining portion and the adapter seating portion of the connector housing, to a rear portion of the connector housing, a rotationally discrete keying portion defined on the outer surface of the connector housing, a rotationally discrete locking portion defined on the outer surface of the connector housing, and a nominal housing portion defined on an outer surface of the connector housing and interrupted by the keying portion and the locking portion of the connector housing, the ferrule comprises a 2.5 millimeter nominal ferrule diameter, is retained by the ferrule retaining portion of the connector housing, and comprises an optical fiber bore, the keying portion of the connector housing comprises at least one rotationally discrete contact surface that is structurally configured to inhibit rotation of the connector housing about the longitudinal axis when engaged with a complementary keying portion of an optical connector port, the locking portion of the connector housing includes a rearwardly facing port engagement face and a locking portion recess that is positioned rearward of the port engagement face, the locking portion recess of the locking portion is obstructed from the leading edge plane of the connector housing along the advancing direction of the fiber optic connector by the port engagement face, the port engagement face of the locking portion is structurally configured to inhibit axial movement of the connector housing along a retracting direction of the fiber optic connector when engaged with a complementary locking portion of an optical connector port, the cable adapter comprises an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and comprises an optical fiber extending along optical fiber passageway of the cable adapter and the optical fiber bore of the ferrule, and the connector housing comprises a line of sight from the keying portion to the leading edge plane of the connector housing that is obstructed only by the type SC conversion housing along an advancing direction of the fiber optic connector.

In yet another embodiment, a connectorized fiber optic cable assembly includes a ferrule, a connector housing, a cable adapter, a fiber optic cable, and a hardened conversion housing, where the connector housing includes a ferrule retaining portion, an adapter seating portion, a longitudinal axis extending transversely from a leading edge plane of the front portion of the connector housing, through the ferrule retaining portion and the adapter seating portion of the connector housing, to a rear portion of the connector housing, a rotationally discrete keying portion defined on the outer surface of the connector housing, a rotationally discrete locking portion defined on the outer surface of the connector housing, and a nominal housing portion defined on an outer surface of the connector housing and interrupted by the keying portion and the locking portion of the connector housing, the ferrule includes a 2.5 millimeter nominal ferrule diameter, is retained by the ferrule retaining portion of the connector housing, and includes an optical fiber bore, the keying portion of the connector housing includes at least one rotationally discrete contact surface that is structurally configured to inhibit rotation of the connector housing about the longitudinal axis when engaged with a complementary keying portion of an optical connector port, the locking portion of the connector housing includes a rearwardly facing port engagement face and a locking portion recess that is positioned rearward of the port engagement face, the locking portion recess of the locking portion is obstructed from the leading edge plane of the connector housing along the advancing direction of the fiber optic connector by the port engagement face, the port engagement face of the locking portion is structurally configured to inhibit axial movement of the connector housing along a retracting direction of the fiber optic connector when engaged with a complementary locking portion of an optical connector port, the cable adapter including an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and includes an optical fiber extending along optical fiber passageway of the cable adapter and the optical fiber bore of the ferrule, the hardened conversion housing including a pair of opposing fingers including opposing interior faces that extend parallel to, and are arranged symmetrically about, the longitudinal axis of the connector housing, a finger spacing between the opposing interior faces of the opposing fingers is between 10.80 millimeters and 10.85 millimeters, a finger depth along a direction parallel to the longitudinal axis of the connector housing is between 8.45 millimeters and 8.55 millimeters, a finger width along a direction perpendicular to the finger depth and the longitudinal axis of the connector housing is less than 10 millimeters, outer faces of the opposing fingers lie along a common outside diameter of between 15.75 millimeters and 15.85 millimeters, an outer face of one of the opposing fingers is truncated in a plane parallel to the opposing interior faces to define a truncated span of between about 14.75 millimeters and about 14.95 millimeters, extending from the outer face of the truncated opposing finger to the outer face of the opposite finger, and the connector housing includes a line of sight from the keying portion to the leading edge plane of the connector housing that is obstructed only by the hardened conversion housing along an advancing direction of the fiber optic connector.

In yet another embodiment, a connectorized fiber optic cable assembly includes a ferrule, a connector housing, a cable adapter, a fiber optic cable, and a type SC conversion housing, where the connector housing includes a ferrule retaining portion positioned at a front portion of the connector housing, an adapter seating portion, a longitudinal axis extending transversely from a leading edge plane of the front portion of the connector housing, through the ferrule retaining portion and the adapter seating portion of the connector housing, to a rear portion of the connector housing, a nominal housing portion defined on an outer surface of the connector housing, and a locking portion defined on the outer surface of the connector housing and interrupting the nominal housing portion of the connector housing, the locking portion of the connector housing includes a port engagement face that extends inward from the nominal housing portion of the connector housing toward the longitudinal axis and is oriented transverse to the longitudinal axis, the locking portion of the connector housing further includes a locking portion recess positioned rearward of the port engagement face of the locking portion and inward of the nominal housing portion of the connector housing, the locking portion recess is oriented transverse to the port engagement face of the locking portion and includes a planar surface extending across at least a portion of the outer surface of the connector housing, the ferrule includes a 2.5 millimeter nominal ferrule diameter, is retained by the ferrule retaining portion of the connector housing, and includes an optical fiber bore, the cable adapter includes an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and includes an optical fiber extending along optical fiber passageway of the cable adapter and the optical fiber bore of the ferrule, the type SC conversion housing surrounds the ferrule retaining portion of the connector housing and a portion of the connector housing rearward of the ferrule retaining portion of the connector housing, and the type SC conversion housing is positioned forward of the locking portion of the connector housing along the longitudinal axis of the connector housing such that the type SC conversion housing would present potential interfere with engagement of the locking portion of the connector housing with a securing member of an optical port.

In yet another embodiment, a connectorized fiber optic cable assembly includes a ferrule, a connector housing, a cable adapter, a fiber optic cable, and a hardened conversion housing, where the connector housing includes a ferrule retaining portion positioned at a front portion of the connector housing, an adapter seating portion, a longitudinal axis extending transversely from a leading edge plane of the front portion of the connector housing, through the ferrule retaining portion and the adapter seating portion of the connector housing, to a rear portion of the connector housing, a nominal housing portion defined on an outer surface of the connector housing, and a locking portion defined on the outer surface of the connector housing and interrupting the nominal housing portion of the connector housing, the locking portion of the connector housing includes a port engagement face that extends inward from the nominal housing portion of the connector housing toward the longitudinal axis and is oriented transverse to the longitudinal axis, the locking portion of the connector housing further includes a locking portion recess positioned rearward of the port engagement face of the locking portion and inward of the nominal housing portion of the connector housing, the locking portion recess is oriented transverse to the port engagement face of the locking portion and includes a planar surface extending across at least a portion of the outer surface of the connector housing, the ferrule includes a 2.5 millimeter nominal ferrule diameter, is retained by the ferrule retaining portion of the connector housing, and includes an optical fiber bore, the cable adapter includes an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and includes an optical fiber extending along optical fiber passageway of the cable adapter and the optical fiber bore of the ferrule, the hardened conversion housing includes a pair of opposing fingers includes opposing interior faces that extend parallel to, and are arranged symmetrically about, the longitudinal axis of the connector housing, a finger spacing between the opposing interior faces of the opposing fingers is between 10.80 millimeters and 10.85 millimeters, a finger depth along a direction parallel to the longitudinal axis of the connector housing is between 8.45 millimeters and 8.55 millimeters, a finger width along a direction perpendicular to the finger depth and the longitudinal axis of the connector housing is less than 10 millimeters, outer faces of the opposing fingers lie along a common outside diameter of between 15.75 millimeters and 15.85 millimeters, an outer face of one of the opposing fingers is truncated in a plane parallel to the opposing interior faces to define a truncated span e of between about 14.75 millimeters and about 14.95 millimeters, extending from the outer face of the truncated opposing finger to the outer face of the opposite finger, and the hardened conversion housing surrounds the ferrule retaining portion of the connector housing and the locking portion of the connector housing to interfere with engagement of the locking portion of the connector housing with a securing member of an optical port.

In yet another embodiment, a multiport assembly includes a shell defining a cavity positioned within the shell, a plurality of optical adapters positioned within the cavity of the shell, the optical adapters structurally configured to receive, align, and optically couple dissimilar optical connectors, a plurality of optical connection ports including respective connection port passageways permitting external optical connectors to access the plurality of optical adapters positioned within the cavity of the shell, the connection port passageways including respective connector insertion paths, and a plurality of push-button securing members associated with respective ones of the connection port passageways, where each push-button securing member is biased in an engaged position, in which a locking portion of the push-button securing member is positioned within a corresponding connector insertion path, and is selectively positionable into and out of a disengaged position, in which the locking portion of the push-button securing member is positioned outside the corresponding connector insertion path, and the locking portion of each push-button securing member is configured to permit forcible nondestructive disengagement of an external optical connector from the locking portion of the push-button securing member upon application of a force on the external optical connector in a direction along an axis extending along the corresponding connector insertion path.

In yet another embodiment, a multiport assembly includes a shell defining a cavity positioned within the shell, a plurality of optical adapters positioned within the cavity of the shell, the optical adapters structurally configured to receive, align, and optically couple dissimilar optical connectors, a plurality of optical connection ports including respective connection port passageways permitting external optical connectors to access the plurality of optical adapters positioned within the cavity of the shell, the connection port passageways including respective connector insertion paths, and a plurality of push-button securing members associated with respective ones of the connection port passageways, where each push-button securing member includes a locking portion, where the push-button securing member is repositionable between a disengaged position, in which the locking portion is positioned outside a corresponding connector insertion path, and an engaged position, in which the locking portion is positioned within the corresponding connector insertion path.

In yet another embodiment, a method for selectively connecting a fiber optic connector to a multiport assembly includes inserting a connector housing of a fiber optic connector into a connector port of a multiport assembly, engaging a push-button securing member of the multiport assembly with the connector housing, moving the push-button securing member away from a connector insertion path defined by the multiport assembly, moving the connector housing through the push-button securing member of the multiport assembly, and engaging a locking portion of the push-button securing member with the connector housing to selectively couple the connector housing to the multiport assembly.

In yet another embodiment, a method for selectively disconnecting a fiber optic connector from a multiport assembly includes disengaging a locking portion of a push-button securing member of a multiport assembly from a connector housing of a fiber optic connector, moving the push-button securing member away from a connector insertion path defined by the multiport assembly, and moving the connector housing through the push-button securing member of the multiport assembly.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 3A schematically depicts a cross-section of the fiber optic connector of FIG. 1, according to one or more embodiments shown and described herein;

FIG. 3B schematically depicts another cross-section of a port engagement face of the fiber optic connector of FIG. 1, according to one or more embodiments shown and described herein;

FIG. 12 schematically depicts a perspective view of another connector housing, according to one or more embodiments shown and described herein;

FIG. 13 schematically depicts a cross-section of the connector housing for FIG. 12 along section 13-13 of FIG. 12, according to one or more embodiments shown and described herein;

DETAILED DESCRIPTION

Embodiments described herein generally relate to various devices for forming an optical connection between optical fibers. More particularly, embodiments described herein include fiber optic connectors including connector housings having a locking portion that selectively engages a push-button securing member of a multiport assembly to selectively couple the fiber optic connector to the multiport assembly. The locking portion of the connector housing and/or the push-button securing member of the multiport assembly may be configured to allow forcible, non-destructive disengagement of the connector housing from the multiport assembly upon the application of a predetermined force to the connector housing. In this way, damage to the multiport assembly and/or the fiber optic connector resulting from unexpected or unintended forces applied to the connector housing may be minimized.

In embodiments, the push-button securing members may generally intersect a connection port passageway of the multiport assembly, which may reduce the need for securing features positioned on the perimeter of the connection port passageway. By reducing the need for securing features positioned on the perimeter of the connection port passageway, adjacent connection port passageways on the multiport assembly may be positioned closer to one another such that a greater number of connection port passageways to be included in a multiport assembly without increasing the overall size of the multiport assembly. Furthermore, the push-button securing members may be configured to automatically engage a connector housing upon the full insertion of the connector housing to the connection port passageway, such that a user may selectively couple the connector housing to the multiport assembly with one hand, thereby simplifying the connection of the connector housing to the multiport assembly. The connector housings may further include a keying portion that selectively engages a corresponding keying portion of the multiport assembly to ensure and maintain the rotational orientation of the fiber optic connector with the multiport assembly. These and other embodiments of fiber optic connectors and multiport assemblies are disclosed in greater detail herein with reference to the appended figures.

As used herein, the term "advancing direction" refers to a direction that is parallel to a longitudinal axis of the connector housing and in which the connector housing may be inserted into a corresponding port. Conversely, reference herein to the "retracting direction" refers to the opposite direction, i.e., a direction that is parallel to the longitudinal axis of the connector housing and in which the connector housing may be retracted from a corresponding port. In the appended figures, the advancing direction is depicted as "AD" and the retracting direction is depicted as "RD."

Figure 1:
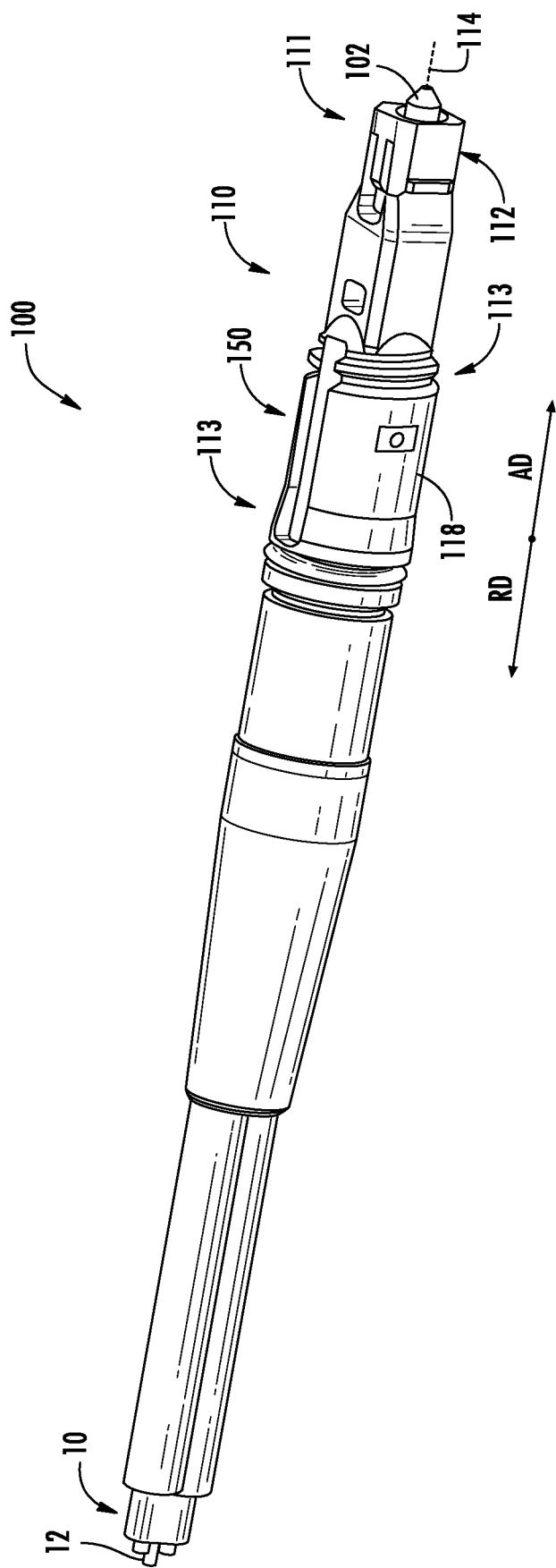
FIG. 1 schematically depicts a perspective view of a fiber optic connector including a connector housing, according to one or more embodiments shown and described herein.

Referring initially to FIG. 1, a perspective view of a fiber optic connector 100 is schematically depicted. The fiber optic connector 100 generally includes a connector housing 110, including a ferrule retaining portion 112 at a front portion 111 of the connector housing 110. The connector housing 110 further includes a rear portion 113 positioned opposite the front portion 111 in an axial direction. The ferrule retaining portion 112 of the connector housing 110 is generally configured to hold and retain a ferrule 102 that is positioned at least partially within the ferrule retaining portion 112.

In embodiments, the fiber optic connector 100 is coupled to a fiber optic cable 10 at the rear portion 113 of the fiber optic connector 100. The fiber optic cable 10 generally includes an optical fiber 12 extending through the fiber optic cable 10. The optical fiber 12 may generally extend through the connector housing 110 and the ferrule 102 along a longitudinal axis 114 of the connector housing 110. For fiber optic cables 10 including a single optical fiber 12, the optical fiber 12 may be coaxial with the longitudinal axis 114. For multifiber cables, this alignment will be orthogonally offset for one, more than one, or all of the optical fibers of the cable.

In embodiments, the connector housing 110 generally includes an outer surface 118 that extends around a perimeter of the connector housing 110, and the outer surface 118 may include one or more cross-sectional shapes. For example, in the embodiment depicted in FIG. 1, the front portion 111 of the connector housing 110 includes a rectangular cross-section including planar sides, while the rear portion 113 of the connector housing 110 includes a curved outer surface 118.

Figure 2:
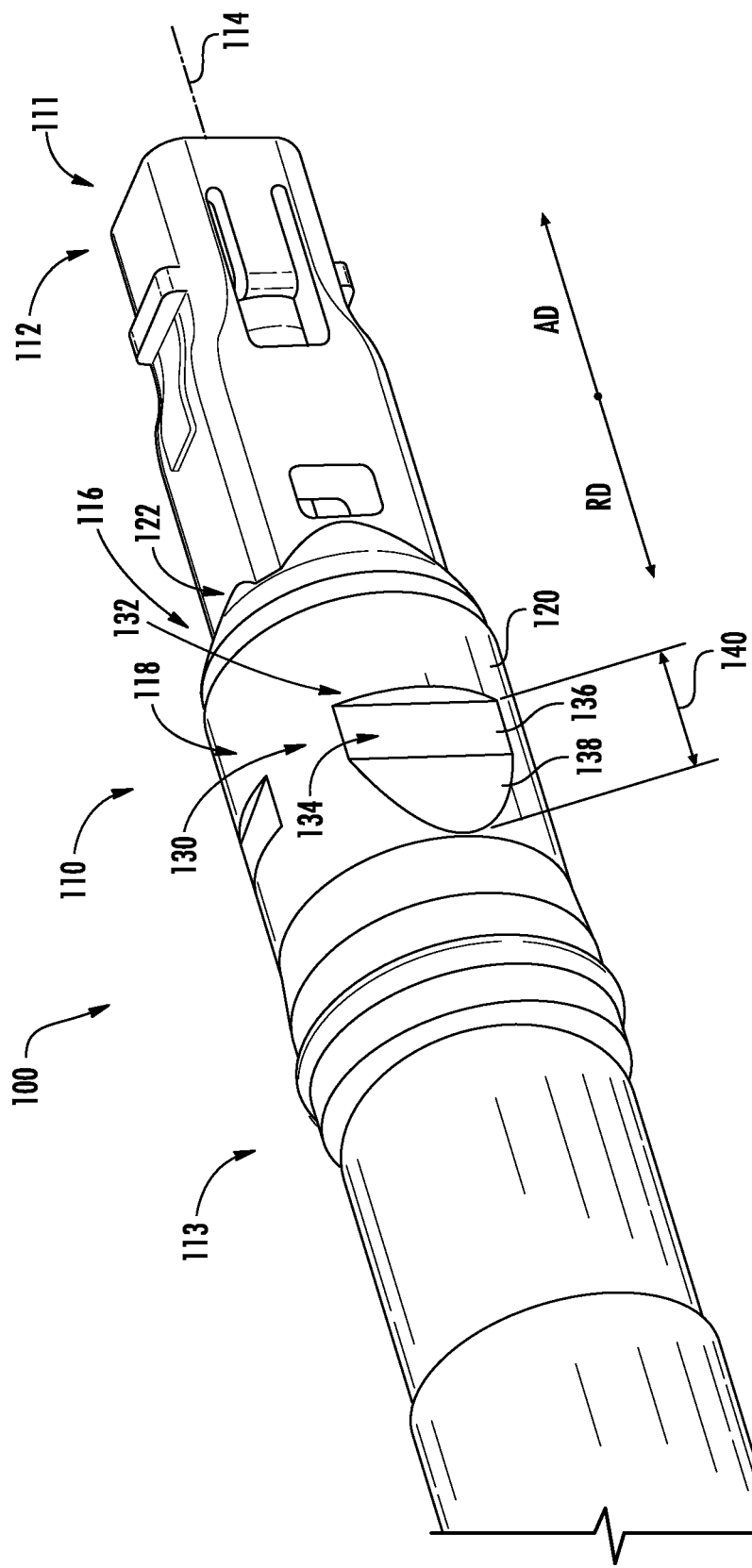
FIG. 2 schematically depicts a lower perspective view of the fiber optic connector of FIG. 1 including a locking portion, according to one or more embodiments shown and described herein.

Referring to FIG. 2, a lower perspective view of the connector housing 110 is schematically depicted. The connector housing 110 includes a nominal housing portion 120 defined on the outer surface 118 of the connector housing 110. The nominal housing portion 120 extends about and axially along the outer surface 118 of the connector housing 110 but may be interrupted by a variety of distinctive surface features defined on the outer surface 118 of the connector housing 110. The nominal housing portion 120 is referenced herein as being "nominal" to help distinguish it from the various distinctive surface features that are defined on the connector housing 110. Without these distinctive surface features, the nominal housing portion 120 would form a relatively uniform and continuous surface of the connector housing 110, and would extend far enough along a length of the connector housing 110 to provide a convenient surface for a user to handle the connector housing 110 without the use of a specialized connector handling tool or other supplemental hardware. Reference herein to a surface feature, e.g., a keying portion or a locking portion, that is "defined on" the outer surface 118 of the connector housing 110 contemplates that the surface feature may be a subtractive surface feature, like a cut-out, or an additive surface feature, like a projection.

In the embodiment depicted in FIG. 2, the connector housing 110 includes a locking portion 130 defined on the outer surface 118 at the rear portion 113 of the connector housing 110. The locking portion 130 is positioned on a curved surface of the outer surface 118 in the embodiment depicted in FIG. 2, and generally includes a port engagement face 132 that extends inward from the nominal housing portion 120 toward the longitudinal axis 114 of the connector housing 110. In one embodiment, the port engagement face 132 may generally define an edge-to-edge cross sectional cut-out of the connector housing 110, in which the port engagement face 132 extends across the outer surface 118 in a direction transverse to the longitudinal axis 114. In other embodiments, the port engagement face 132 may generally define a pocket cut-out of the connector housing 110, in which the port engagement face 132 extends radially inward from the outer surface 118 toward the longitudinal axis 114, and is bounded in a circumferential direction by the nominal housing portion 120.

The locking portion 130 further includes a locking portion recess 134 positioned rearward of the port engagement face 132 and inward of the nominal housing portion 120. The locking portion recess 134 includes a generally planar surface 136 that is oriented transverse to the port engagement face 132 and that extends at least partially across the outer surface 118 of the connector housing 110. The locking portion recess 134 may also include a ramp portion 138 positioned rearward of the planar surface 136 and that extends outward from the planar surface 136 to the nominal housing portion 120 moving along the locking portion recess 134 in the retracting direction.

Figure 17:
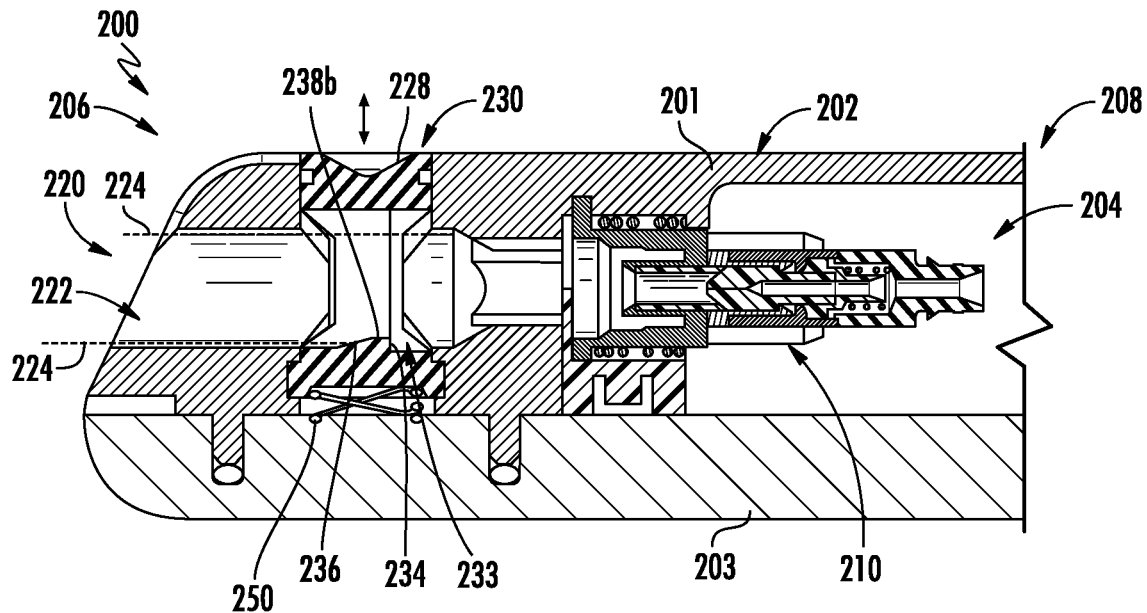
FIG. 17 schematically depicts cross-section of an optical connector port of the multiport assembly of FIG. 16, according to one or more embodiments shown and described herein.

In embodiments, the port engagement face 132 extends inward from the nominal housing portion 120 of the connector housing 110 by a distance that corresponds to features of a push-button securing member 230 (FIG. 17) such that the connector housing 110 may be selectively coupled to and removed from the push-button securing member 230 (FIG. 17). In one embodiment, the port engagement face 132 extends inward from the nominal housing portion 120 by a distance of at least about 0.75 millimeters.

Referring collectively to FIGS. 2 and 3A, the port engagement face 132 generally defines a planar surface that is oriented transverse to the longitudinal axis 114. The port engagement face 132 includes and extends between an inner end 131 and an outer end 133 that is positioned outward of the inner end 131. The outer end 133 may include a rounded or chamfered edge, which may assist in preventing breakage of the outer end 133 when the connector housing 110 is forcibly removed from a connection port, as described in greater detail herein.

In some embodiments, the outer end 133 is positioned closer to the front portion 111 of the connector housing 110 in an axial direction than the inner end 131, such that the port engagement face 132 is both rearward and outward facing. In these embodiments, the port engagement face 132 generally defines a plane that intersects the longitudinal axis 114 at an angle that is less than 30 degrees evaluated from perpendicular.

Figure 5:
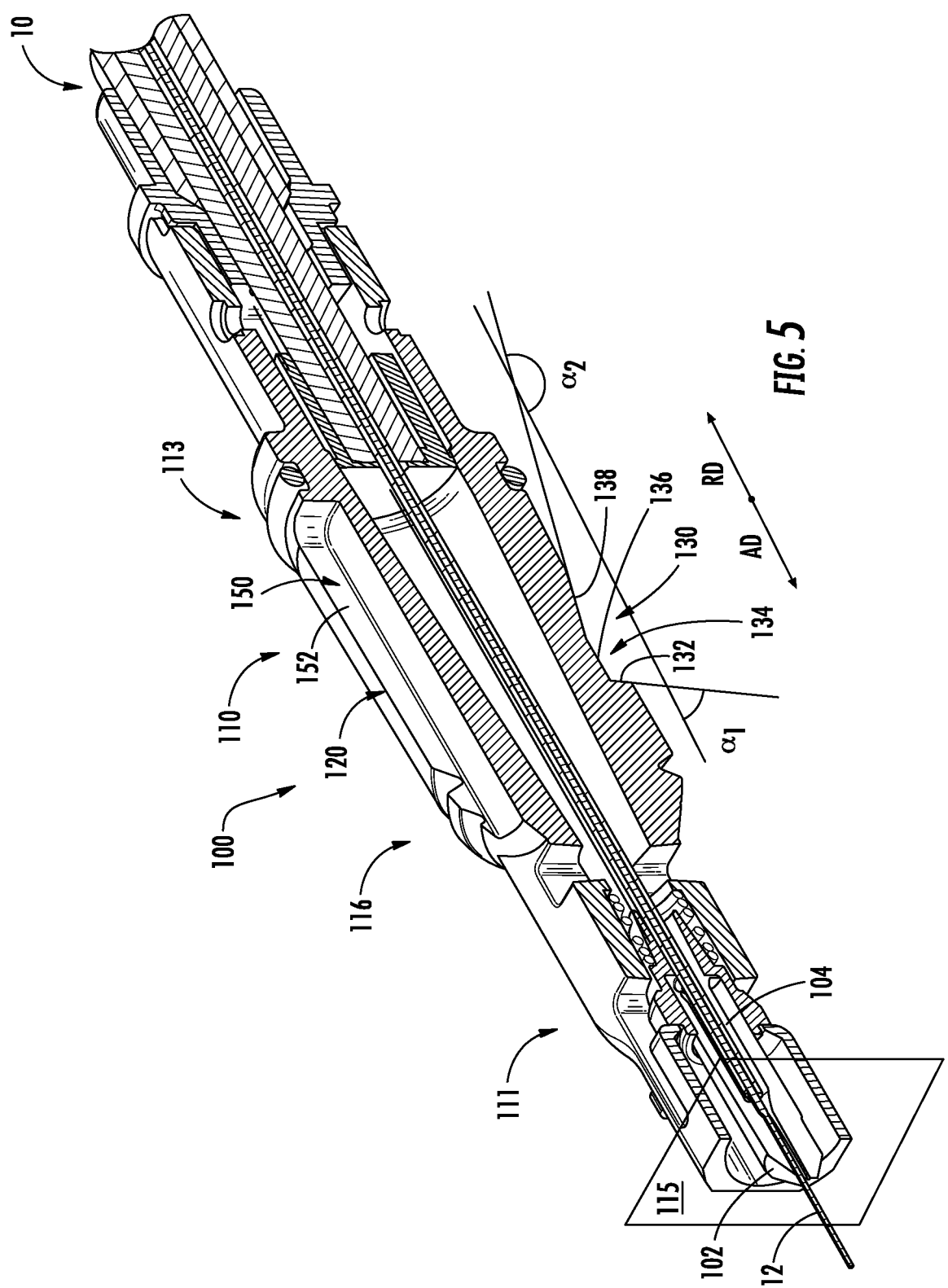
FIG. 5 schematically depicts a perspective cross-section of the connector housing of the fiber optic connector of FIG. 1, according to one or more embodiments shown and described herein.

For example, as best shown in FIG. 5, the port engagement face 132 is a formed as a rearward-facing cut-out that lies in a plane that intersects the longitudinal axis 114 at an acute angle $\alpha_1$, and the ramp portion 138 is formed as a forward-facing cut-out that lies in a plane that intersects the longitudinal axis 114 at an angle $\alpha_2$ that is greater than $\alpha_1$. In embodiments, $\alpha_2$ is generally between 110 degrees and 180 degrees and may generally be selected to correspond to a feature of a push-button securing member 230 (FIG. 17), as described in greater detail herein. As noted above, in embodiments, the angle $\alpha_1$ is generally within 30 degrees of perpendicular (i.e., the port engagement face 132 lies in a plane that intersects the longitudinal axis at an angle between 60 degrees and 90 degrees) such that the port engagement face 132 is outward and rearward facing. By orienting the port engagement face 132 in a rearward and outward facing orientation, the port engagement face 132 may be selectively disengaged from a push-button securing member 230 (FIG. 17) upon the application of a force above a predetermined threshold, as described in greater detail herein. In other embodiments, the port engagement face 132 is oriented such that the port engagement face 132 that extends in a plane that is orthogonal to the longitudinal axis 114.

Referring to FIG. 3B, in some embodiments, the port engagement face 132 may include a locking face 135 that extends in a plane that is orthogonal to the longitudinal axis 114 (FIG. 3A), and a release face 137 positioned outward from the locking face 135. In the embodiment depicted in FIG. 3B, the release face 137 extends in a plane that intersects the locking face 135 at an angle $\varphi_1$. In embodiments, the angle $\varphi_1$ is between about 0 degrees and 30 degrees, inclusive of the endpoints, such that the release face 137 is outward and rearward facing. By including both a locking face 135 that extends in a plane that is orthogonal to the longitudinal axis 114 and a release face 137 that is outward and rearward facing, the port engagement face 132 of the connector housing 110 may be rigidly connected to a push-button securing member 230 (FIG. 17) engaged with the locking face 135. However, the port engagement face 132 of the connector housing may be releasably engaged with a push-button securing member 230 (FIG. 17) engaged with the release face 137 upon the application of a force above a predetermined threshold, as described in greater detail herein.

Referring again to FIGS. 2 and 3A, in embodiments, the front portion 111 has a perimeter extending around the outer surface 118 of the front portion 111 that is less than a perimeter extending around the outer surface 118 of the rear portion 113 of the connector housing 110. The connector housing further includes a transition region 116 positioned between the front portion 111 and the rear portion 113, where the perimeter of the connector housing 110 extending around the outer surface 118 increases moving along the transition region 116 from the front portion 111 to the rear portion 113 in an axial direction.

In embodiments, the connector housing 110 includes a thread 122 extending around the outer surface 118 at the transition region 116. The thread 122 generally includes crests 126 that are separated from one another by a pitch 124. The thread 122 may be utilized to selectively couple one or more conversion housings to the connector housing 110, as described in greater detail herein. While the thread 122 is depicted as being positioned on the transition region 116, it should be understood that the thread 122 may be alternatively or additionally positioned on the outer surface 118 of the front portion 111 and/or the rear portion 113 of the connector housing 110.

In embodiments, the pitch 124 between the crests 126 of the thread 122 is less than a length 140 of the locking portion recess 134 evaluated in an axial direction. Because the pitch 124 of the thread 122 is less than the length 140 of the locking portion recess 134, the locking portion recess 134 may selectively interact with a push-button securing member 230 (FIG. 17) while the pitch 124 prevents the thread 122 from interacting the push-button securing member 230 (FIG. 17), as described in greater detail herein.

Referring particularly to FIG. 3A, the ferrule 102 is positioned within and engaged with the ferrule retaining portion 112 of the connector housing 110. The ferrule 102 defines an optical fiber bore 104 that is configured to retain the optical fiber 12. The optical fiber bore 104 is generally aligned with the longitudinal axis 114 of the connector housing 110 such that the longitudinal axis 114 is coaxial with the optical fiber bore 104.

Figure 4:
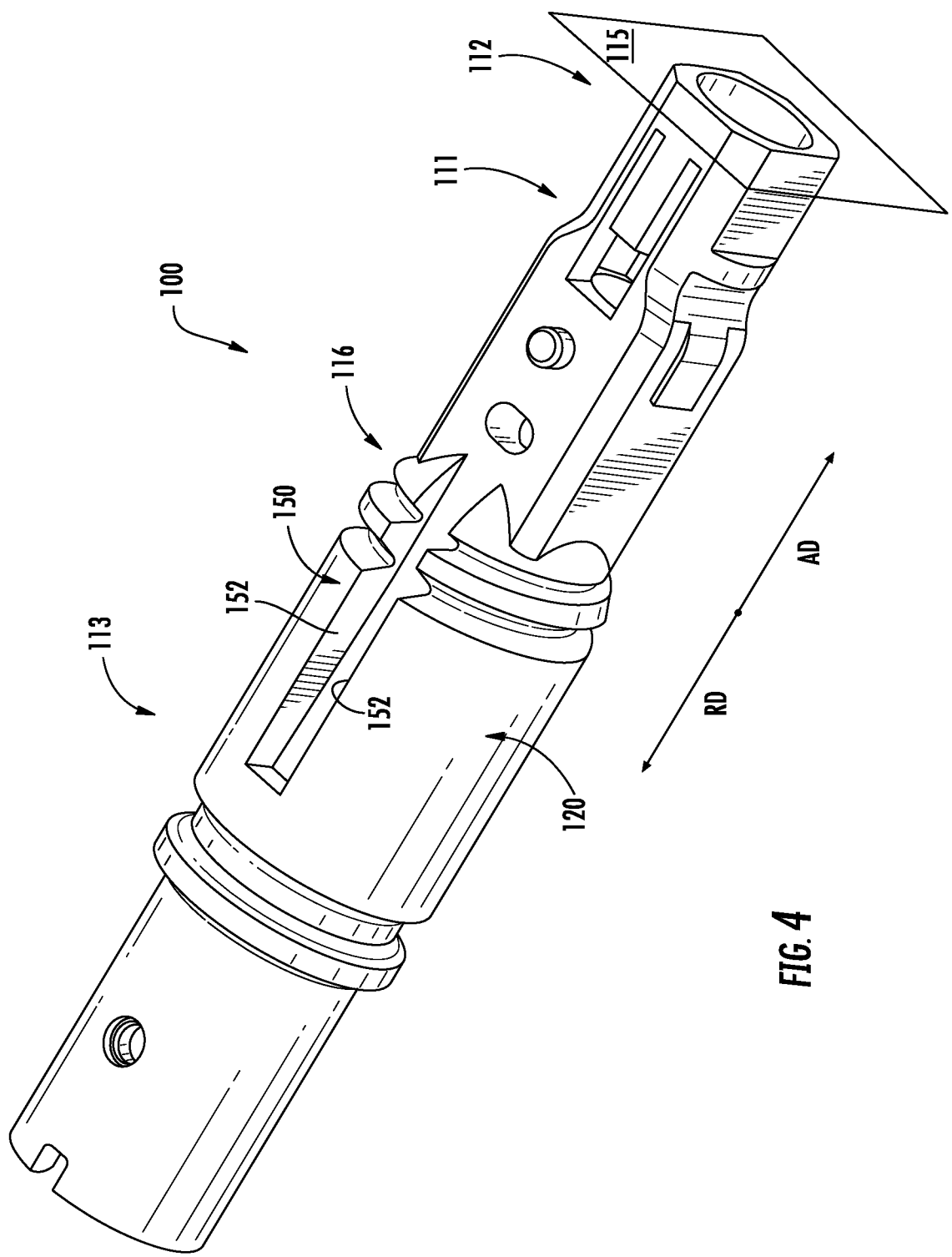
FIG. 4 schematically depicts a top perspective view of the connector housing of the fiber optic connector of FIG. 1, according to one or more embodiments shown and described herein.

Referring collectively to FIGS. 4 and 5, a perspective view of the connector housing 110 and a cross-section of the fiber optic connector 100 are schematically depicted. The connector housing 110 includes a keying portion 150 defined on the outer surface 118 of the connector housing 110, the keying portion 150 including pair of opposing contact surfaces 152. The opposing contact surfaces 152 are structurally configured to inhibit rotation of the connector housing 110 about the longitudinal axis 114 when engaged with a complementary keying portion of an optical connection port 220 (FIG. 17). In the embodiment depicted in FIGS. 4 and 5, the keying portion 150 is positioned at the rear portion 113 of the connector housing 110, and interrupts the nominal housing portion 120. In embodiments, the keying portion 150 of the connector housing 110 extends closer to the front portion 111 of the connector housing 110 than does the locking portion 130 of the connector housing 110, such that the keying portion 150 may contact features of an optical connection port 220 (FIG. 17) prior to the locking portion 130, as described in greater detail herein. In the embodiment depicted in FIG. 5, the keying portion 150 of the connector housing 110 extends at least partially into the transition region 116 of the connector housing 110. In some embodiments, the keying portion 150 may only extend forward into the transition region 116, such that the keying portion 150 terminates prior to the front portion 111 of the connector housing 110 moving forward along the outer surface 118. The keying portion 150 may generally extend in an axial direction a distance that is longer than the transition region 116 and/or the front portion 111 in the axial direction.

Figure 6:
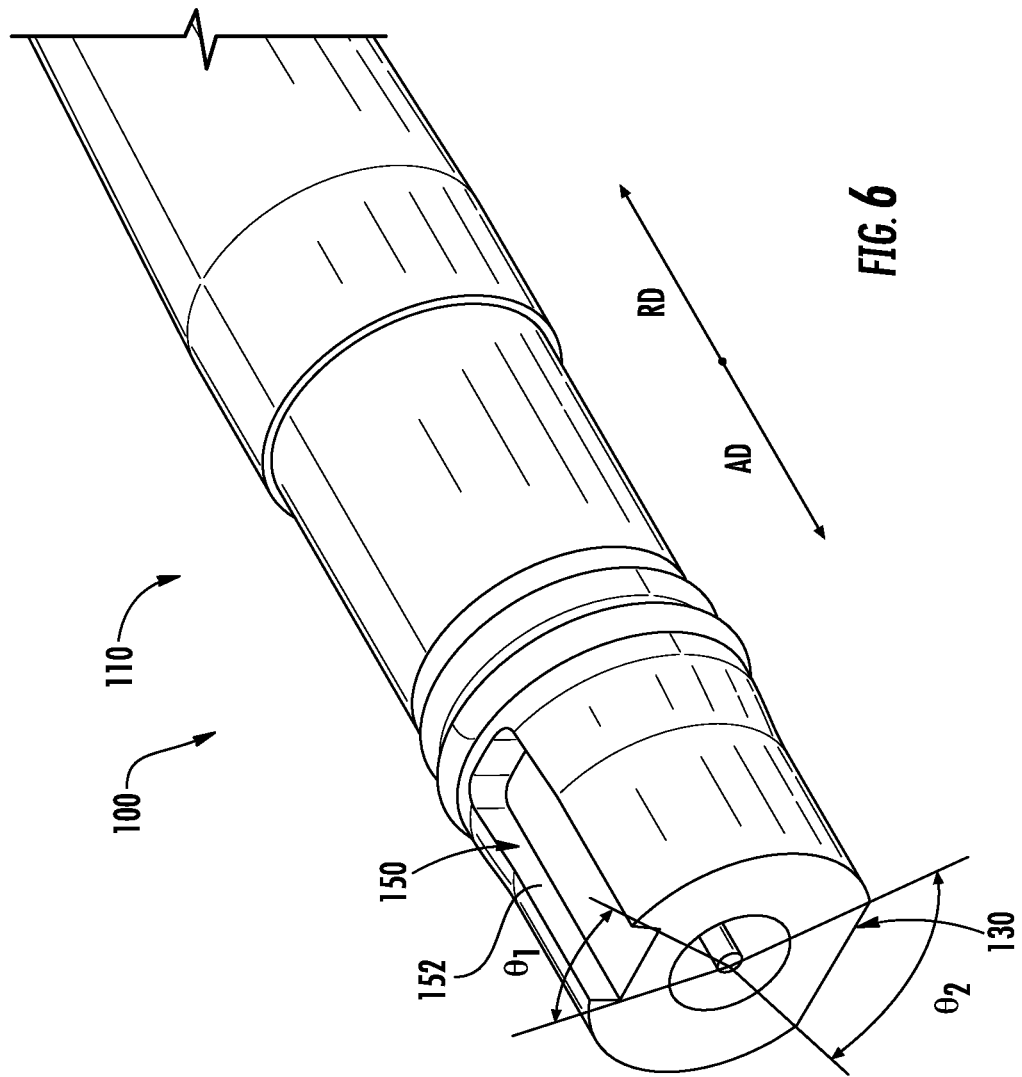
FIG. 6 schematically depicts another cross-section of the fiber optic connector of FIG. 1, according to one or more embodiments shown and described herein.

Referring to FIGS. 5 and 6, in embodiments, the keying portion 150 and/or the locking portion 130 (and portions thereof) may be rotationally discrete on the outer surface 118 of the connector housing 110. As used herein, the term "rotationally" discrete represents a limited width-wise extent along the outer surface 118 of the connector housing 110, as the connector housing 110 is rotated about its longitudinal axis 114. For example, the keying portion 150 may be relatively long and have a relatively narrow width, which width can be described with reference to the rotational arc θ1 circumscribed by the width of the keying portion 150 relative to the longitudinal axis 114 of the connector housing 110. In the illustrated embodiments, the arc θ1 is about 50 degrees, and it is contemplated that the arc θ1 may, in many embodiments, be between about 30 degrees and about 70 degrees. Similarly, in the illustrated embodiments, the locking portion 130 is wider than the keying portion 150, i.e., about 90 degrees, and it is contemplated that the arc θ2 circumscribed by the width of the locking portion 130 may be between about 120 degrees and about 60 degrees. In some embodiments, the locking portion 130 is wider than the keying portion 150 such that the rotational arc θ1 is less than about 30% of the rotational arc θ2. In one embodiment, the rotational arc θ2 is less than 90 degrees. In the embodiment depicted in FIGS. 5 and 6 the rotational arcs θ1, θ2 are mutually exclusive such that the keying portion 150 and the locking portion 130 are defined on different surface portions of the outer surface of the connector housing. In one embodiment, the rotational arc θ2 circumscribed by the width of the locking portion 130 relative to the longitudinal axis 114 of the connector housing 110 is greater than about 90 degrees, and the rotational arc θ1 circumscribed by the width of the keying portion 150 relative to the longitudinal axis 114 of the housing is less than a rotational arc θ2. In another embodiment, the rotational arc θ2 circumscribed by the width of the locking portion 130 relative to the longitudinal axis 114 of the connector housing 110 is less than about 120 degrees, and the rotational arc θ1 is greater than about 60 degrees, but does not exceed about 70 degrees. In one embodiment, the sum of the rotational arcs θ1, θ2 are limited such that $(\theta_1+\theta_2)<180°$.

The keying portion 150 generally has an unobstructed line of sight to a leading edge plane 115 that is defined by the front portion 111 of the connector housing 110 and that is orthogonal to the longitudinal axis 114. The keying portion 150 of the connector housing 110 helps to ensure proper rotational orientation of the fiber optic connector 100 when it is engaged with an optical connection port 220 (FIG. 17) having a complementary keying portion. The locking portion 130 can also be configured to help ensure that the connector housing 110 cannot be inadvertently locked into an optical connection port 220 (FIG. 17) in a rotationally misaligned state. It is contemplated that it may be insufficient to rely on the locking portion 130 alone for proper rotational alignment of the connector housing because, in some instances, there will not be close contact between the respective surfaces of the locking portion recess 134 and a push-button securing member 230 (FIG. 17) of an optical connection port 220 (FIG. 17). In fact, in some embodiments a gap will be intentionally provided between these surfaces to isolate a spring-loaded movement of the push-button securing member 230 (FIG. 17) of the optical connection port 220 (FIG. 17) from the connector housing 110, as described in greater detail herein. It is also noteworthy that the locking portion 130 does not enjoy an unobstructed line of sight with the leading edge plane 115 of the connector housing 110, as is the case with the keying portion 150. The unobstructed line of sight of the keying portion 150 can be used to help ensure proper rotational orientation of the connector housing 110 as the connector housing 110 is initially advanced into a complementary optical connection port 220 (FIG. 17), and before the obstructions of the locking portion 130 begin to interface and interfere with various portions of the optical connection port 220 (FIG. 17). Accordingly, although in embodiments the keying portion 150 and the locking portion 130 are both rotationally discrete and could conceivably be used on their own to help ensure proper rotational alignment, the present inventors have recognized that it may be best to rely on the keying portion 150 for rotational alignment, and the locking portion 130 for engagement, because the keying portion 150 enjoys an unobstructed line of sight that is not subject to inadvertent interference with the optical connection port 220 (FIG. 17), and the locking portion 130 is often designed to avoid close contact with the hardware of the optical connection port 220 (FIG. 17).

In the embodiment depicted in FIGS. 5 and 6, the keying portion 150 comprises the pair of rotationally discrete contact surfaces 152 that interrupt the nominal housing portion 120 as a negative cut-out. The discrete contact surfaces 152 generally include planar surfaces that are accessible without obstruction from the leading edge plane 115 of the connector housing 110. The contact surfaces 152 generally line in planes that intersect a plane defined by the port engagement face 132. In one embodiment, the contact surfaces 152 lie in planes that are orthogonal to the port engagement face 132. For example, in the embodiment depicted in FIGS. 4 and 5, the contact surfaces 152 lie in planes that are generally parallel with the longitudinal axis 114, such that the contact surfaces 152 are may restrict rotation of the connector housing 110 about the longitudinal axis 114. The port engagement face 132 generally lies in a plane that intersects the longitudinal axis 114 of the connector housing 110, such that the port engagement face 132 may restrict axial movement of the connector housing 110 along the longitudinal axis 114, such as when engaged with a corresponding surface within an optical connection port 220 (FIG. 17).

Figure 7:
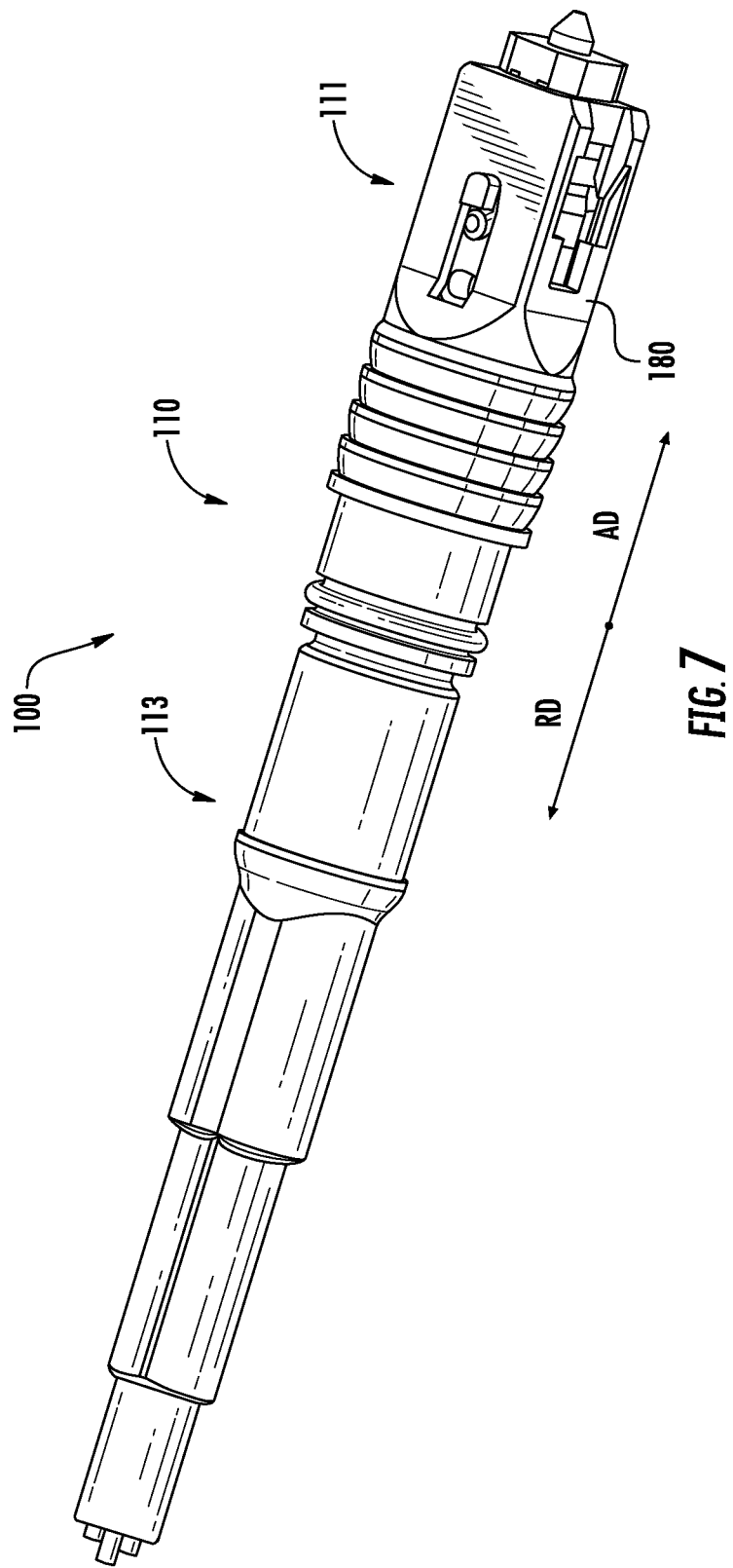
FIG. 7 schematically depicts the fiber optic connector of FIG. 1 with a conversion housing installed to the connecter housing, according to one or more embodiments shown and described herein.
Figure 8:
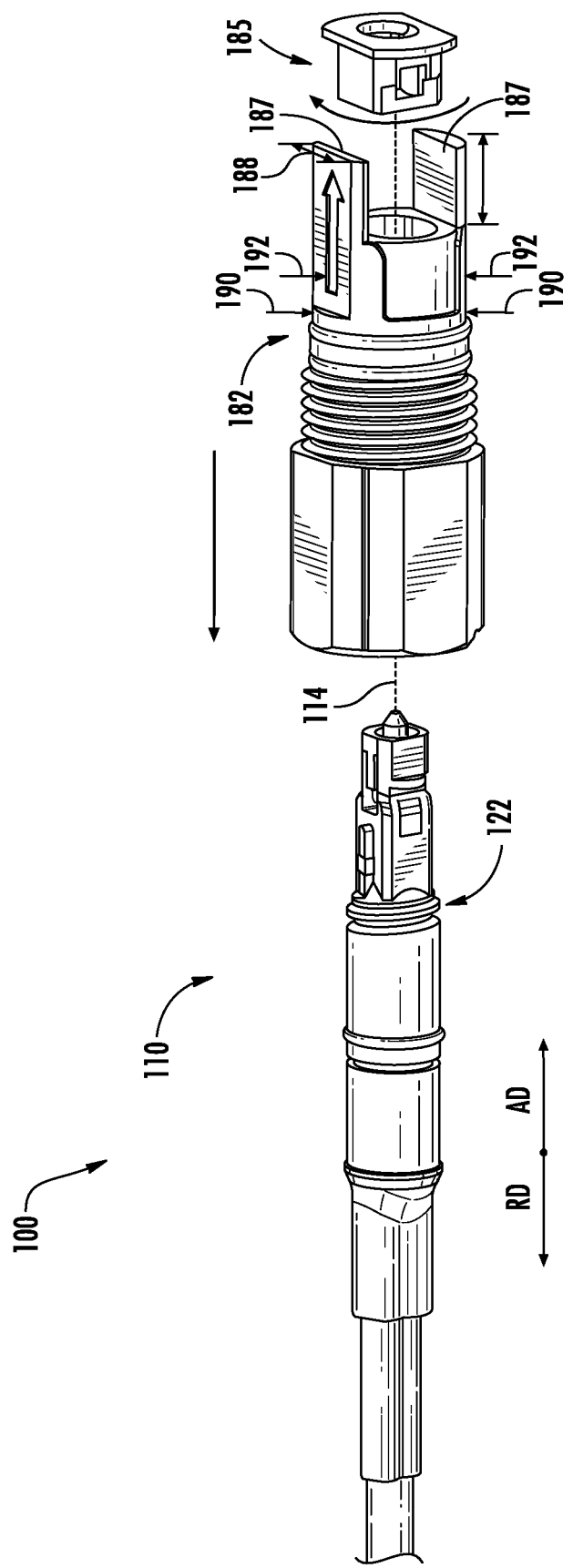
FIG. 8 schematically depicts an exploded view of the fiber optic connector of FIG. 1 including another conversion housing, according to one or more embodiments shown and described herein.
Figure 10:
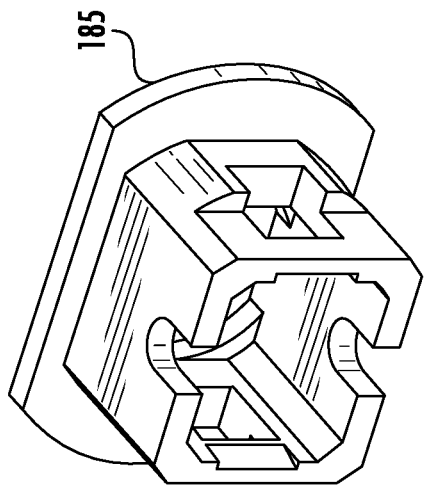
FIG. 10 schematically depicts a rear perspective view of the retaining member of FIG. 9, according to one or more embodiments shown and described herein.
Figure 11:
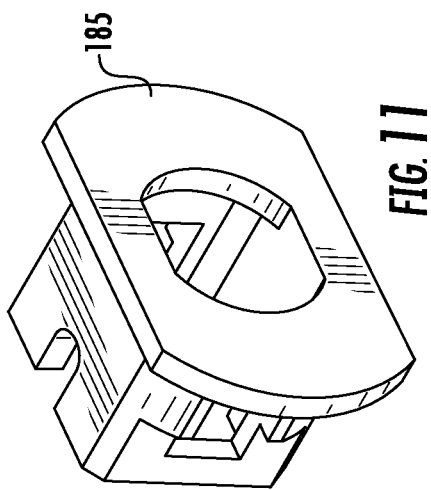
FIG. 11 schematically depicts a front perspective view of the retaining member of FIG. 9, according to one or more embodiments shown and described herein.
Figure 9:
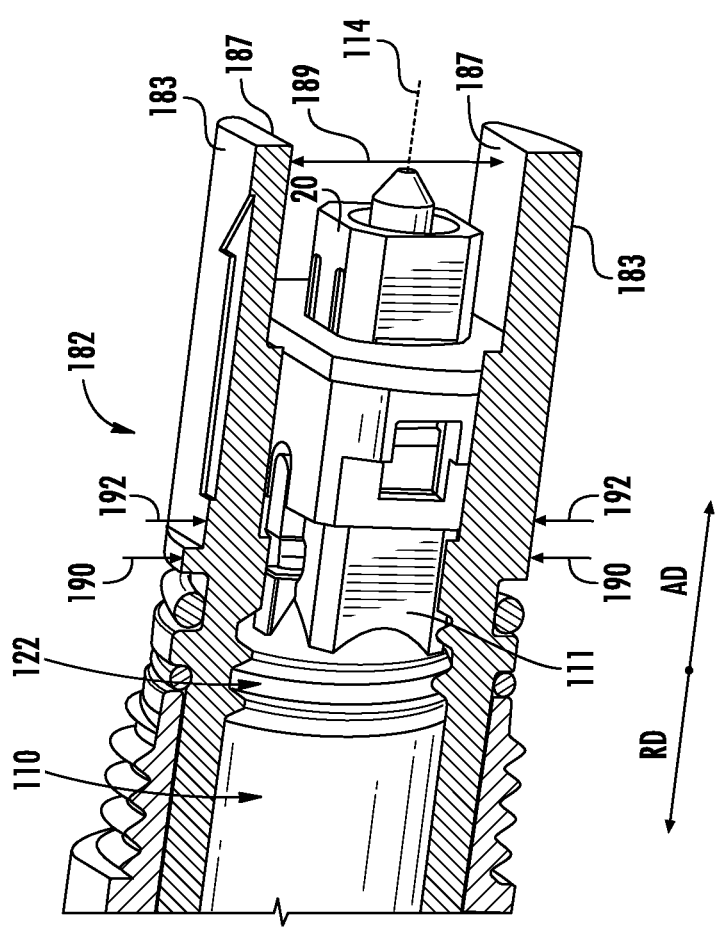
FIG. 9 schematically depicts a cross-section of the conversion housing of FIG. 8 and a retaining member, according to one or more embodiments shown and described herein.

Referring to FIG. 7, a type SC conversion housing 180 is selectively coupled to the front portion 111 of the connector housing 110. In the embodiment depicted in FIG. 7, the type SC conversion housing 180 generally increases perimeter evaluated around the front portion 111 of the connector housing 110, to provide the connector housing 110 a footprint suitable for use in an SC type connection. Type SC conversion housings are characterized by a connector footprint as set forth in IEC 61754-4, published by the International Electrical Commission, which defines the standard interface dimensions for the type SC family of fiber optic connectors and may be updated periodically. As is noted in the aforementioned standard, the parent connector for the type SC connector family is a single position plug connector which is characterized by a 2.5 millimeter nominal ferrule diameter. It includes a push-pull coupling mechanism which is spring loaded relative to the ferrule in the direction of the optical axis. The plug has a single male key which may be used to orient and limit the relative position between the connector and the component to which it is mated. The optical alignment mechanism of the connector is of a resilient sleeve style. IEC 61754-4 defines the standard interface dimensions of active device receptacles for the type SC connectors. The receptacles are used to retain the connector plug and mechanically maintain the optical datum target of the plugs at a defined position within the receptacle housings. The SC connector standard encompasses simplex plug connector interfaces, simplex adaptor connector interfaces, duplex plug connector interfaces, and duplex adaptor connector interfaces.

The connector housing 110 comprises a line of sight from the keying portion 150 (FIG. 6) to the leading edge plane 115 (FIG. 5) of the connector housing 110 that is obstructed only by the type SC conversion housing 180 along the advancing direction of the fiber optic connector 100. The type SC conversion housing 180 surrounds the ferrule retaining portion 112 (FIG. 4) of the connector housing 110 and a portion of the connector housing 110 rearward of the ferrule retaining portion 112 of the connector housing 110. The type SC conversion housing 180 is positioned forward of the locking portion 130 (FIG. 5) of the connector housing 110 along the longitudinal axis 114 of the connector housing 110 such that the type SC conversion housing 180 would present potential interference with engagement of the locking portion 130 (FIG. 5) of the connector housing 110 with a securing member of an optical port.

Referring to FIGS. 8, 9, 10, and 11, a hardened conversion housing 182 is schematically depicted. In embodiments, the hardened conversion housing 182 includes internal threads that engage the thread 122 of the connector housing 110. The hardened conversion housing 182 may be retained in place by a retention member 185 that may be selectively coupled to the front portion 111 of the connector housing 110. The retention member 185 may be configured to mechanically interfere with and prevent rotation of the hardened conversion housing 182 with respect to the connector housing 110, thereby retaining the hardened conversion housing 182 on the thread 122 of the connector housing 110. In embodiments, the hardened conversion housing 182 includes opposing fingers 183 that comprise interior faces 187 that extend parallel to and are arranged symmetrically about the longitudinal axis 114 of the connector housing 110. In embodiments, the opposing interior faces 187 of the opposing fingers 183 are spaced apart from one another by a distance 189, which is selected to be between about 10.80 millimeters and about 10.85 millimeters, inclusive of the endpoints. Each of the fingers 183 have a depth 186 evaluated along a direction parallel to the longitudinal axis 114 of the connector housing 110 that is between about 8.45 millimeters and about 8.55 millimeters, inclusive of the endpoints. Each of the fingers 183 further include a width 188 evaluated along a direction perpendicular to the finger depth 186 and the longitudinal axis 114 of the connector housing 110 that is less than about 10 millimeters. Outer faces of the opposing fingers 183 lie along a common outside diameter 190 of between about 15.75 millimeters and about 15.85 millimeters, inclusive of the endpoints. The outer face of one of the opposing fingers 183 is truncated in a plane parallel to the opposing interior faces 187 to define a truncated span 192 extending from the outer face of the truncated opposing finger 183 to the outer face of the opposite finger 183, the span 192 being between about 14.75 millimeters and about 14.95 millimeters, inclusive of the endpoints.

In embodiments, the connector housing 110 comprises a line of sight from the keying portion 150 (FIG. 6) to the leading edge plane 115 (FIG. 5) of the connector housing 110 that is obstructed only by the hardened conversion housing 182 along the advancing direction of the fiber optic connector 100. The hardened conversion housing 182 surrounds the ferrule retaining portion 112 (FIG. 4) of the connector housing 110 and a portion of the locking portion 130 (FIG. 5) of the connector housing 110 such that the hardened conversion housing 182 would interfere with engagement of the locking portion 130 of the connector housing 110 with a securing member of an optical port.

Referring to FIGS. 12 and 13, a perspective view and a cross-section of another embodiment of a connector housing 110 are schematically depicted, respectively. In the embodiment depicted in FIG. 13, the outer surface 118 of the rear portion 113 of the connector housing 110 includes planar surfaces, as compared to the curved surface depicted in FIG. 1 and described above. The planar surfaces may correspond to planar surfaces within a port assembly configured to receive the connector housing. In the embodiment depicted in FIG. 13, the outer surface 118 of the rear portion 113 of the connector housing 110 forms a hexagonal shape, however, it should be understood that the connector housing 110 may include any suitable number of planar surfaces. In the embodiment shown in FIGS. 12 and 13, the connector housing 110 includes the locking portion 130, but the keying portion 150 (FIG. 6) may optionally be omitted. Because the connector housing 110 includes planar surfaces which may correspond to complementary planar surfaces in a port assembly, rotational mis-alignment between the connector housing 110 and the port assembly may be limited. For example, the connector housing 110 may only be insertable to the port assembly in a number of rotational positions that corresponds the number of planar surfaces of the connector housing 110.

Figure 14:
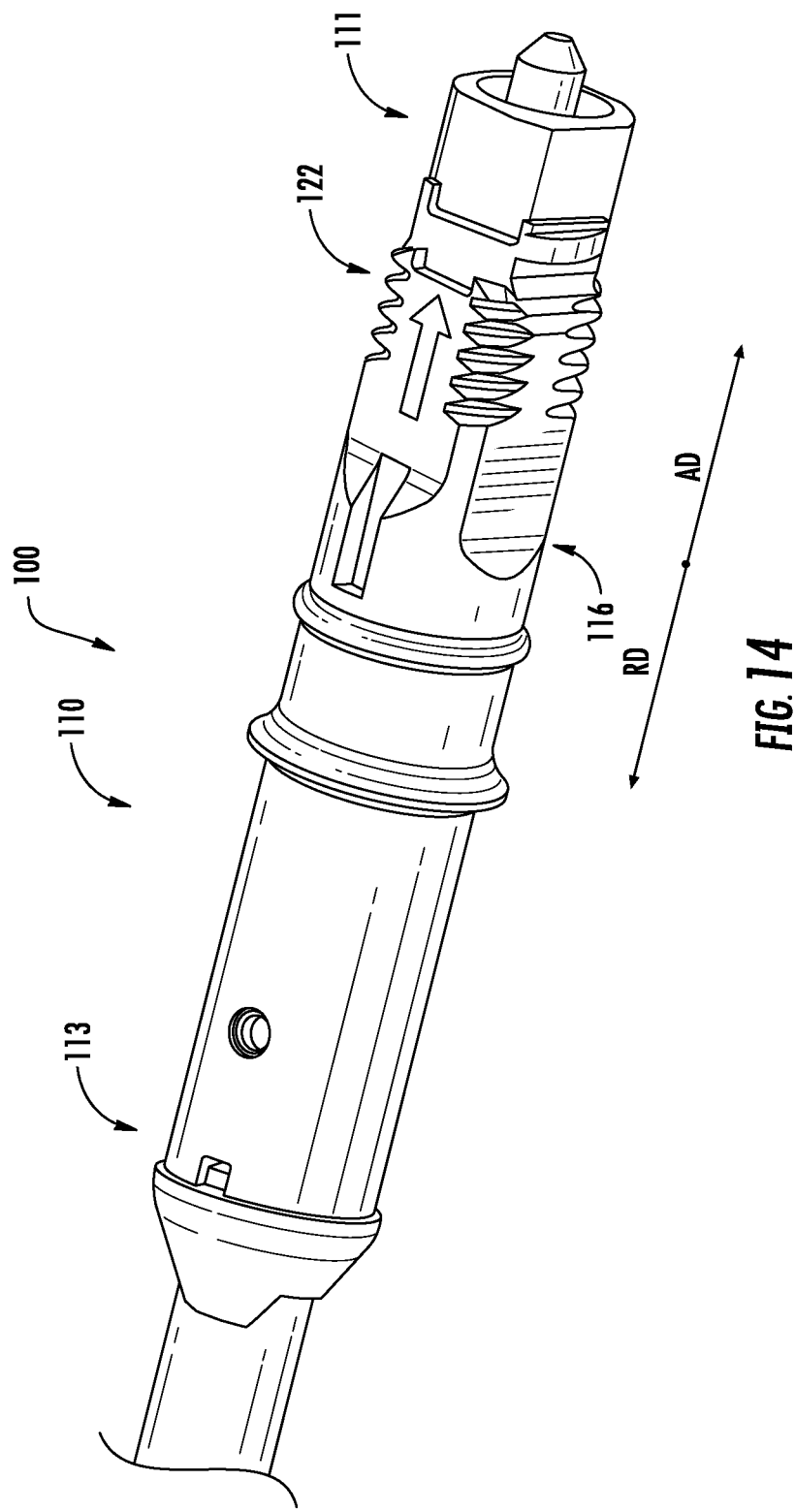
FIG. 14 schematically depicts a perspective view of another connector housing, according to one or more embodiments shown and described herein.

Referring to FIG. 14, a perspective view of another connector housing 110 is schematically depicted. In the embodiment depicted in FIG. 14, the thread 122 is positioned on the front portion 111 of the connector housing 110, forward of the transition region 116. As described above, the thread 122 may be utilized to selectively couple a conversion housing to the connector housing, and the thread 122 may be positioned on the front portion 111, the transition region 116, and/or the rear portion 113 of the connector housing 110.

Figure 15:
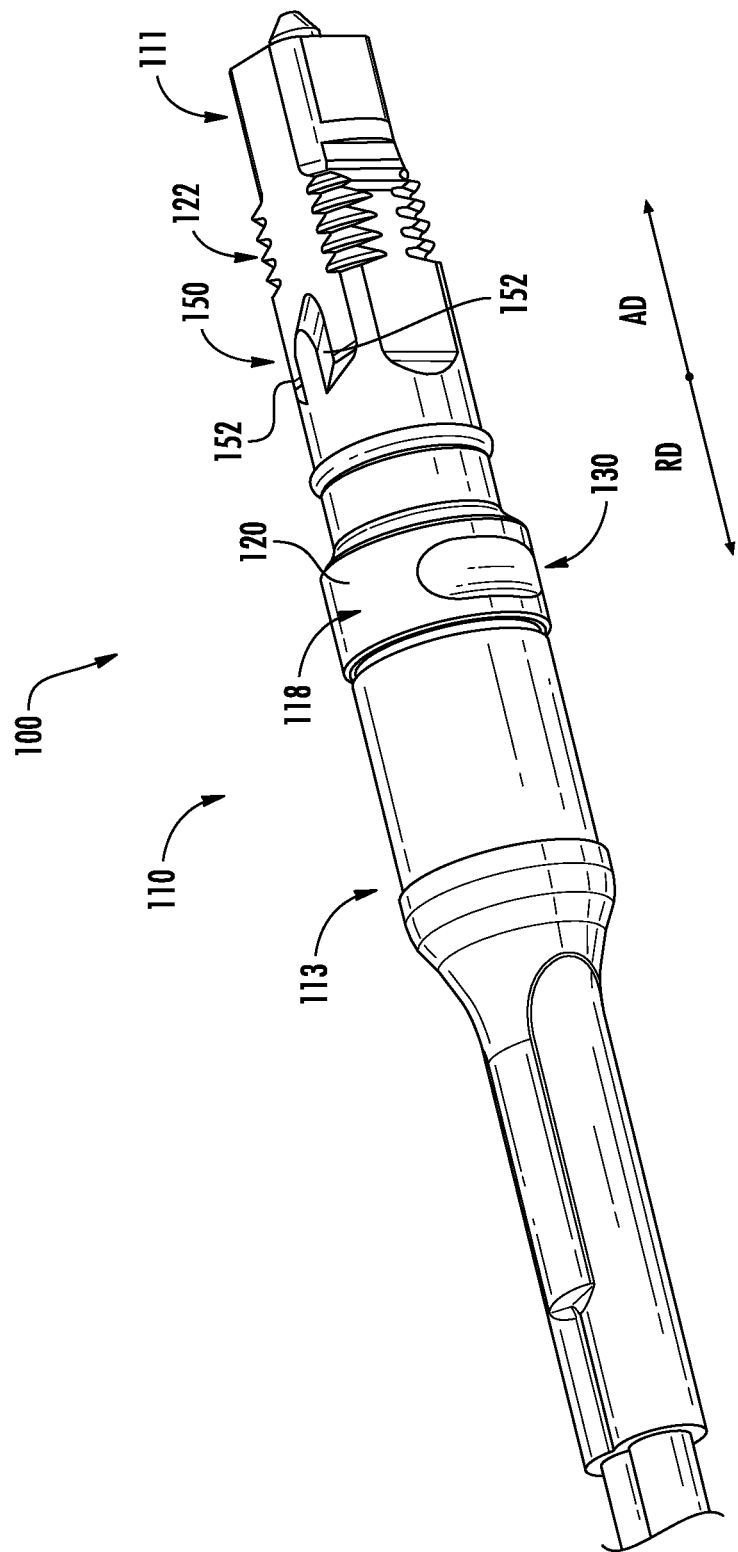
FIG. 15 schematically depicts a perspective view of another connector housing, according to one or more embodiments shown and described herein.

Referring to FIG. 15, a perspective view of another connector housing 110 is schematically depicted. In the embodiment depicted in FIG. 15, the contact surfaces 152 of the keying portion 150 extend outward as a positive surface projection from the connector housing 110, as compared to the recessed contact surfaces 152 described above. The contact surfaces 152 may be configured to engage with recessed contact surfaces of a port assembly to align the connector housing 110. Additionally, in the embodiment depicted in FIG. 15, the locking portion 130 is formed as a curved, concave surface recessed from the nominal housing portion 120, as compared to the locking portions 130 described above having the port engagement face 132 (FIG. 5). The concave surface of the locking portion 130 may be configured to engage with a push-button securing member 230 (FIG. 28) including opposing arms 274 (FIG. 28), as described in greater detail herein.

The fiber optic connectors 100 described above may be utilized to optically couple the optical fibers 12 (FIG. 3A) to other optical fibers. For example the fiber optic connectors 100 may be selectively coupled to an optical connector port to optically couple the optical fiber 12 (FIG. 3A) to another optical fiber positioned within the optical connector port. To facilitate the connection of multiple fiber optic connectors 100, "multiport" assemblies described herein may include multiple optical connector ports. The structure and configuration of example multiport assemblies and the interaction of the connector housing 110 of the fiber optic connectors 100 are described below.

Figure 16:
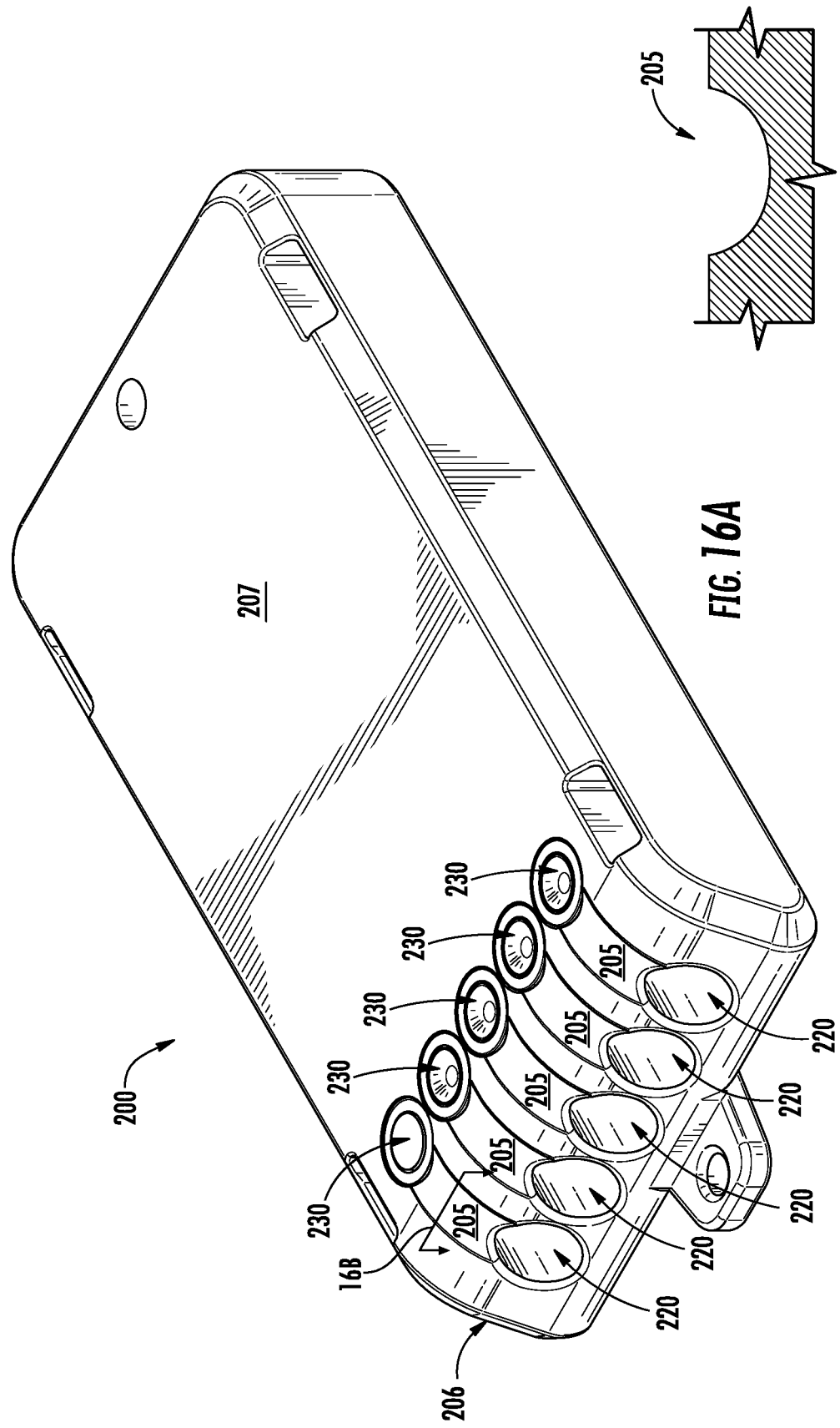
FIG. 16A schematically depicts a multiport assembly, according to one or more embodiments shown and described herein.
FIG. 16B schematically depicts a cross-section of the multiport assembly of FIG. 16A, according to one or more embodiments shown and described herein.

Referring collectively to FIGS. 16A and 16B, a perspective view of a multiport assembly 200 and a section view of the multiport assembly 200 along section 16B-16B are schematically depicted, respectively. The multiport assembly 200 generally includes a plurality of optical connection ports 220 that are configured to receive fiber optic connectors 100 (FIG. 1). In the embodiment depicted in FIG. 16A, the multiport assembly 200 includes five optical connection ports 220, however, it should be understood that multiport assemblies 200 according to the present disclosure may include any suitable number of optical connection ports 220. The multiport assembly 200 includes an upward-facing top surface 207 and an outward-facing front end 206. In embodiments, the multiport assembly 200 generally includes scallops 205 associated and aligned with each of the optical connection ports 220 and extending between the outward-facing front end 206 and the top surface 207. The scallops 205 generally include a cut-out extending into the outward-facing front end 206 and the top surface 207 of the multiport assembly 200 and may provide a tactile indication of the positioning of the optical connection ports 220 and a push-button securing member 230 associated with the optical connection port 220. For example, a user may insert a fiber optic connector 100 (FIG. 1) into the optical connection port 220, and/or may depress a push-button securing member 230 to remove a fiber optic connector 100 (FIG. 1) from the multiport assembly 200. In some settings, the multiport assembly 220 may be difficult to reach and/or the user may not have a direct line of sight to the optical connection port 220 and/or the push-button securing member 230, and the scallop 205 may provide tactile feedback to the user to locate the optical connection port 220 and/or the push-button securing member 230.

Figure 18:
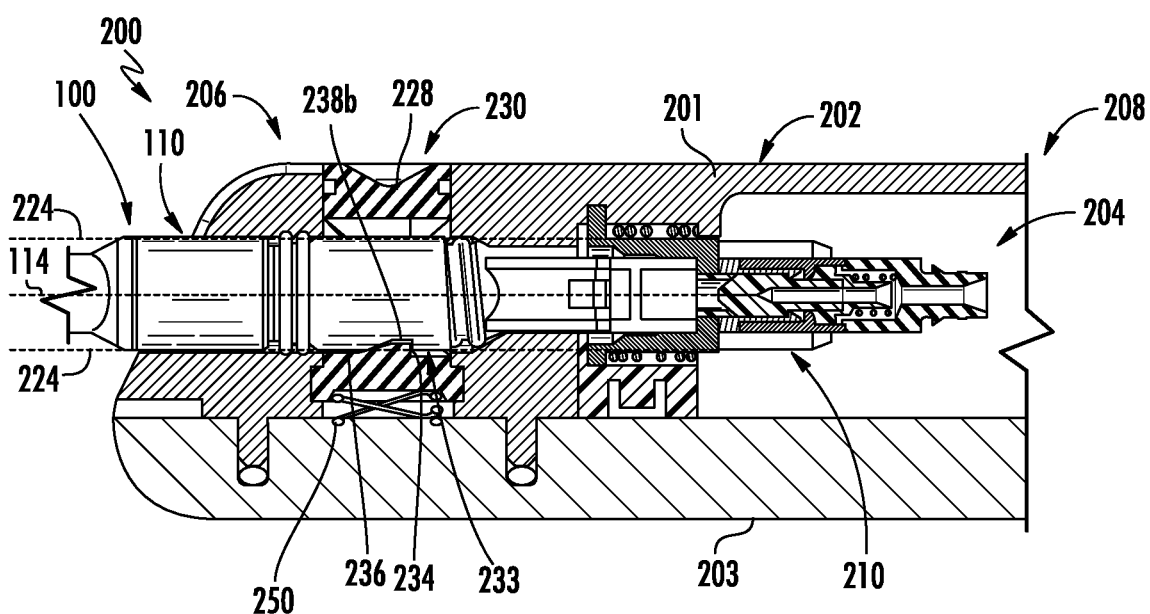
FIG. 18 schematically depicts a fiber optic connector inserted into the optical connector port of FIG. 17, according to one or more embodiments shown and described herein.

Referring collectively to FIGS. 17 and 18, a cross-section of one of the plurality of optical connection ports 220 without and with a fiber optic connector 100 positioned within the optical connection port 220 are schematically depicted, respectively. In embodiments the optical connection ports 220 are generally positioned at a front end 206 of the multiport assembly 200 and extend toward a rear end 208 of the multiport assembly 200 positioned opposite the front end 206. The multiport assembly 200 includes a shell 202 that defines a cavity 204 positioned within the shell 202. In the embodiment depicted in FIGS. 17 and 18, the shell 202 includes an upper member 201 that is coupled to a lower member 203 to form the shell 202. In other embodiments, the shell 202 may have a unitary construction, or may include multiple members coupled to one another to define the cavity 204.

In embodiments, the multiport assembly 200 includes a plurality of optical adapters 210 positioned in the cavity 204 that correspond to each of the optical connection ports 220. Each of the optical adapters 210 are structurally configured to receive, align, and optically couple dissimilar optical connectors. For example, the optical adapters 210 are configured to receive the fiber optic connector 100 on one side, and optically couple the fiber optic connector 100 to another fiber optic connector including a different shape.

Each of the optical connection ports 220 include a connection port passageway 222 that includes an open end positioned opposite the cavity 204 and that permits an external optical connector 100 to access a corresponding optical adapter 210 positioned within the cavity 204 of the shell 202. Each of the connection port passageways 222 define a connector insertion path 224 extending inward along the connection port passageway 222 to the optical adapter 210. The connector insertion path 224 generally defines the path a fiber optic connector 100 follows upon being inserted to the connection port passageway 222.

The multiport assembly 200 includes a plurality of push-button securing members 230, each of which intersect a corresponding connector insertion path 224. The push-button securing members 230 are movable in a direction that is transverse to the connection port passageway 222, as described in further detail herein.

Figure 21:
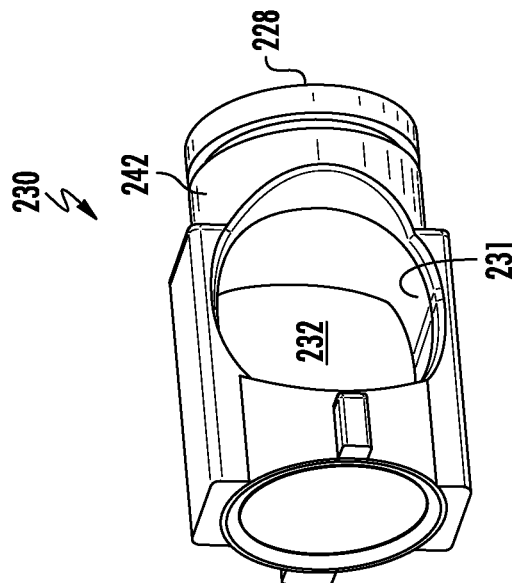
FIG. 21 schematically depicts a side perspective view of a push-button securing member of the multiport assembly of FIG. 16, according to one or more embodiments shown and described herein.
Figure 20:
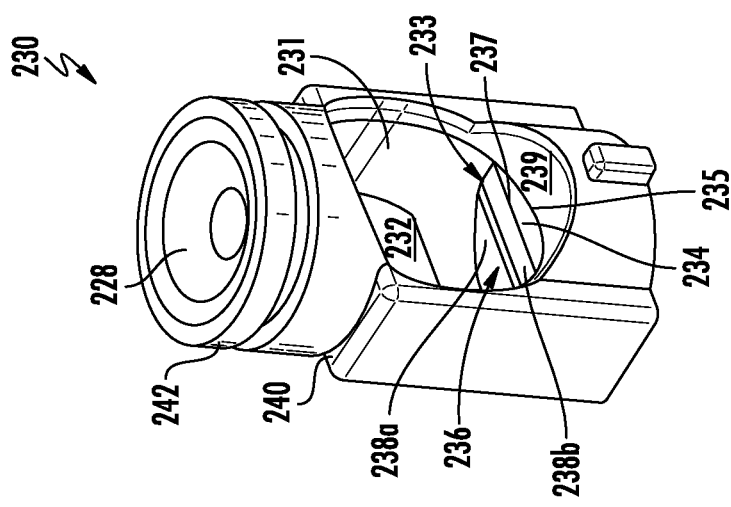
FIG. 20 schematically depicts a rear perspective view of a push-button securing member of the multiport assembly of FIG. 16, according to one or more embodiments shown and described herein.
Figure 19:
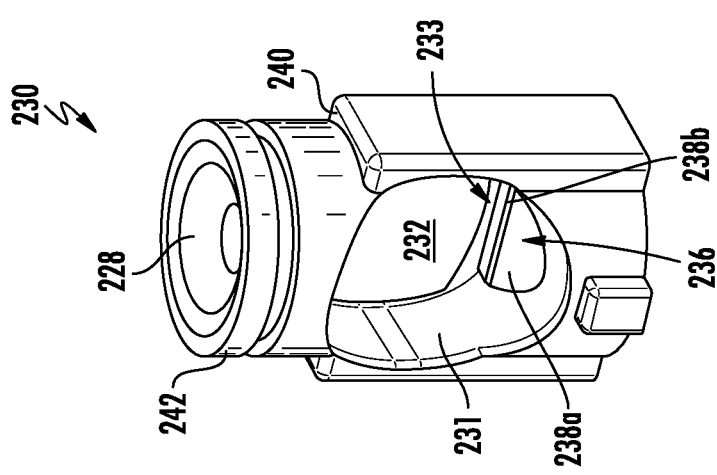
FIG. 19 schematically depicts a front perspective view of a push-button securing member of the multiport assembly of FIG. 16, according to one or more embodiments shown and described herein.

Referring collectively to FIGS. 19, 20, and 21, a rear perspective view, a front perspective view, and a side view of a push-button securing member 230 are schematically depicted, respectively. The push-button securing members 230 generally include a main body 242 and a retention portion 240 extending outward from the main body 242. The retention portion 240 may be configured to contact the shell 202 (FIG. 18) of the multiport assembly 200 (FIG. 18) and retain the push-button securing members 230 within the shell 202 of the multiport assembly 200. Each push-button securing member 230 generally defines a bore 232 extending through the push-button securing member 230, each bore 232 defining an inner perimeter 231. While the bore 232 depicted in FIGS. 19-21 is depicted as including a circular shape, it should be understood that the bore 232 may include any suitable shape for receiving a fiber optic connector 100 (FIG. 1). For example, in some embodiments, the bore 232 may include planar surfaces configured to interface with planar surfaces of a connector housing 110 (FIG. 13).

Each push-button securing member 230 includes a locking portion 233 including a connector engagement face 234 positioned on the bore 232. When installed to the multiport assembly 200 (FIG. 17), in some embodiments, the connector engagement face 234 is generally oriented transverse to the corresponding connector insertion path 224 (FIG. 17), and defines a locking portion recess 239 that is generally obstructed from the open end of the connector insertion path 224 (FIG. 17) by the connector engagement face 234. The connector engagement face 234 extends between an inner end 237 an outer end 235 positioned outward from the inner end 237, as evaluated from a center of the bore 232. In embodiments, the outer end 235 may include a rounded or chamfered edge, which may assist in preventing breakage of the outer end 235 when a connector housing 110 (FIG. 18) is forcibly removed from the connection port passageway 222 (FIG. 18), as described in greater detail herein.

In some embodiments, the outer end 235 is positioned on the inner perimeter 231 of the bore 232 such that the connector engagement face 234 extends inward from the inner perimeter 231. In other embodiments, the connector engagement face 234 may extend outward from the inner perimeter 231 of the bore 232. The push-button securing member 230 further includes a ramp 236 that extends between the inner perimeter 231 of the bore 232 to the inner end 237 of the connector engagement face 234, such that the ramp 236 is upward and forward facing when the push-button securing member 230 is positioned within the multiport assembly 200 (FIG. 17). The ramp 236 generally includes an ascending portion 238a that extends inward from the inner perimeter 231 of the bore 232 and a plateau portion 238b that extends between the ascending portion 238a and the inner end 237 of the connector engagement face 234. The ascending portion 238a of the ramp 236 is oriented to progressively constrict the corresponding connector insertion path 224 (FIG. 17).

Referring again to FIGS. 17 and 18, the plateau portion 238b of each of the push-button securing members 230 is generally aligned with the connector insertion path 224. In embodiments, the ramp 236 of each of the push-button securing members 230 is positioned forward of the connector engagement face 234 of the push-button securing members 230. In other words, the ramps 236 of each of the push-button securing members 230 are positioned closer to the front end 206 of the multiport assembly 200 than the connector engagement face 234 of the push-button securing member 230. In this way, the ramp 236 may contact a fiber optic connector 100 being inserted along the connector insertion path 224 prior to the connector engagement face 234, as described in greater detail herein.

In some embodiments, the connector engagement face 234 of each of the push-button securing members 230 defines a plane that is orthogonal to the connector insertion path 224. In other embodiments, the connector engagement face 234 of each of the push-button securing members 230 are oriented such that the inner end 237 (FIG. 20) of the connector engagement face 234 is positioned closer to the front end 206 of the multiport assembly 200 than the outer end 235 (FIG. 20) of the connector engagement face 234. In these embodiments, the connector engagement face 234 of each of the plurality of push-button securing members 230 defines a plane that intersects the corresponding connector insertion path 224 at an angle that is less than 30 degrees from perpendicular, such that the connector engagement face 234 faces rearward and upward. By orienting the connector engagement face 234 of each of the push-button securing members 230 rearward and upward, a fiber optic connector 100 may be removed from the multiport assembly 200 upon an application of force to the fiber optic connector 100 in a direction along the connector insertion path 224, as described in greater detail herein.

In embodiments, a resilient member 250 is engaged with each of the push-button securing members 230. The resilient members 250 may bias the push-button securing members 230, and may generally include a spring, such as and without limitation a compression spring, a tension spring, a torsion spring, or the like. In embodiments, the resilient members 250 include a spring constant of between about 10 newtons per millimeter and about 50 newtons per millimeter, inclusive of the endpoints. In another embodiment, the resilient members 250 include a spring constant of between about 12 newtons per millimeter and about 16 newtons per millimeter, inclusive of the endpoints. Increasing the spring constant may increase a force required to move the push-button securing members 230 between an engaged position and a disengaged position, as described in greater detail herein. The resilient members 250 may include a free length of between about 3 millimeters and about 20 millimeters, inclusive of the endpoints. In one embodiment, the resilient members 250 have a free length of between about 5 millimeters and about 8 millimeters, inclusive of the endpoints.

The push-button securing members 230 are repositionable between an engaged position, in which the locking portion 233 of each of the push-button securing members 230 is positioned within and intersects the corresponding connector insertion path 224, and a disengaged position, in which the locking portion 233 is spaced apart from the corresponding connector insertion path 224. More particularly, the push-button securing members 230 are repositionable between an engaged position, in which the connector engagement face 234 of each of the push-button securing members 230 is positioned within and intersects the corresponding connector insertion path 224, and a disengaged position, in which the connector engagement face 234 is spaced apart from the corresponding connector insertion path 224.

In embodiments, the resilient members 250 bias the push-button securing members 230 into the engaged position, such that a force must be applied to resilient members 250 to reposition the push-button securing members 230 into the disengaged position.

Figure 22:
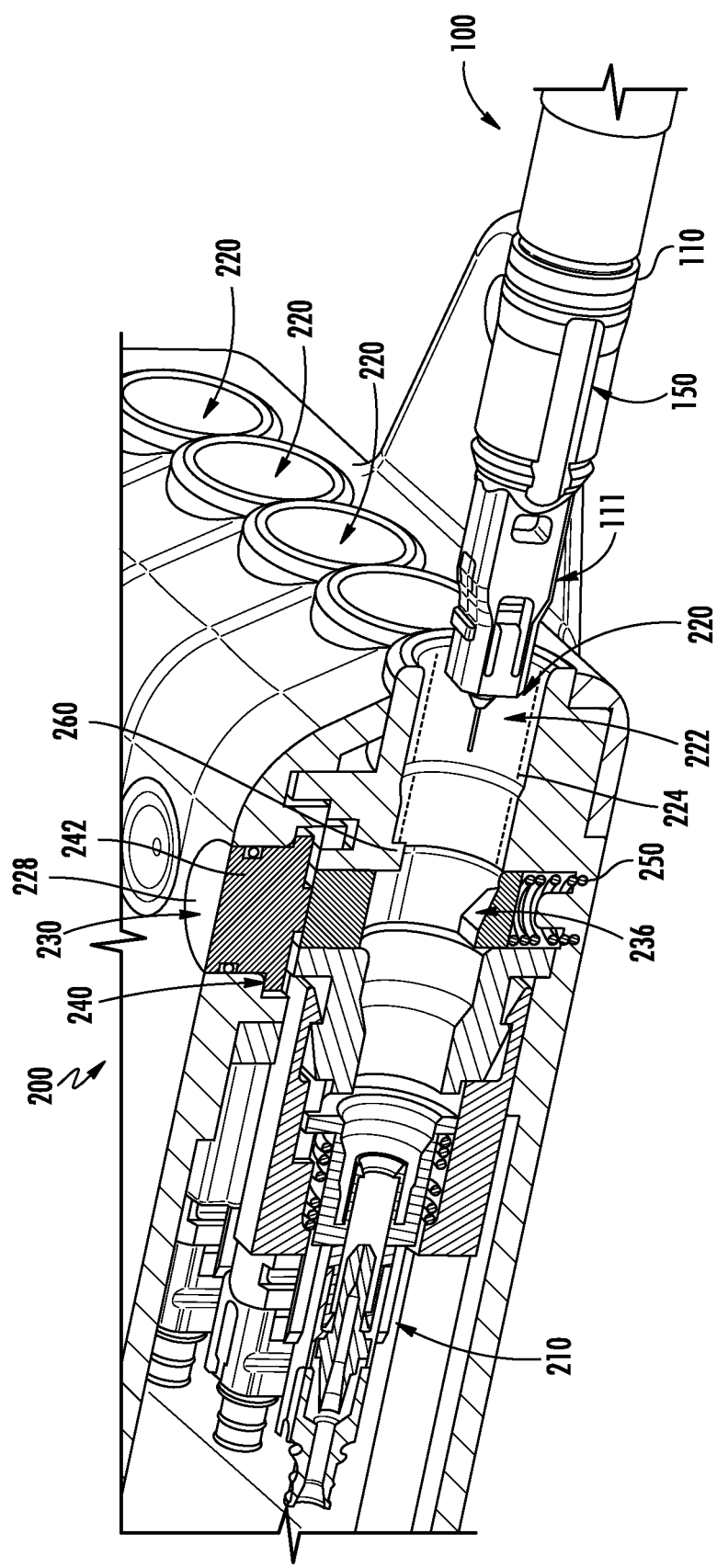
FIG. 22 schematically depicts a fiber optic connector approaching the multiport assembly of FIG. 16, according to one or more embodiments shown and described herein.

For example and referring to FIG. 22, a fiber optic connector 100 is depicted approaching an optical connection port 220. As shown in FIG. 22, the front portion 111 of the connector housing 110 is initially inserted within the connector insertion path 224 of the connection port passageway 222.

Figure 23:
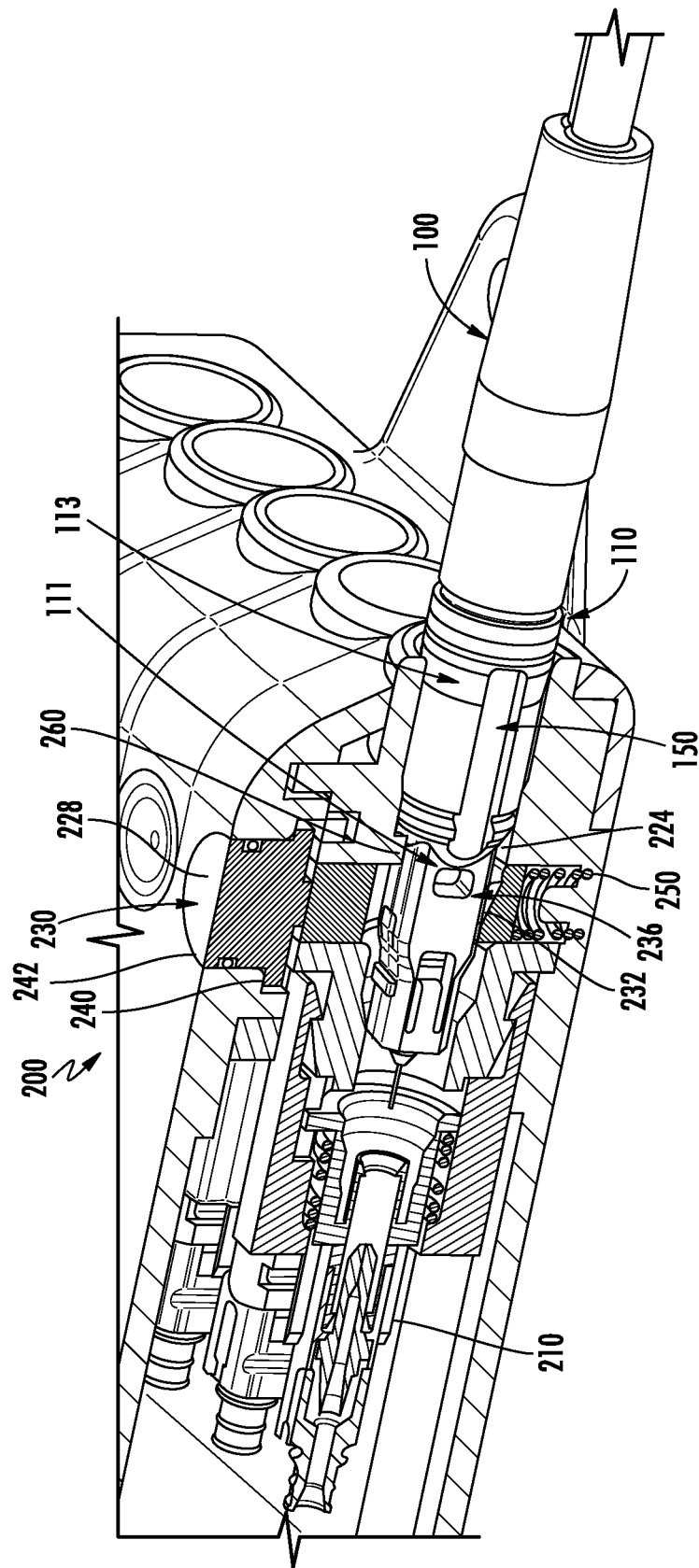
FIG. 23 schematically depicts the fiber optic connector inserted within an optical connection port of the multiport assembly of FIG. 16, according to one or more embodiments shown and described herein.

Referring to FIG. 23, as the fiber optic connector 100 is further inserted along the connector insertion path 224, the front portion 111 of the connector housing 110 may pass through the bore 232 of the push-button securing member 230. As described above, in some embodiments the perimeter of the front portion 111 of the connector housing 110 may be less than a perimeter of the rear portion 113 of the connector housing 110, and in some configurations, the front portion 111 of the connector housing may be sized to pass through the bore 232 of the push-button securing member 230 without contacting the ramp 236 of the push-button securing member 230.

Figure 24:
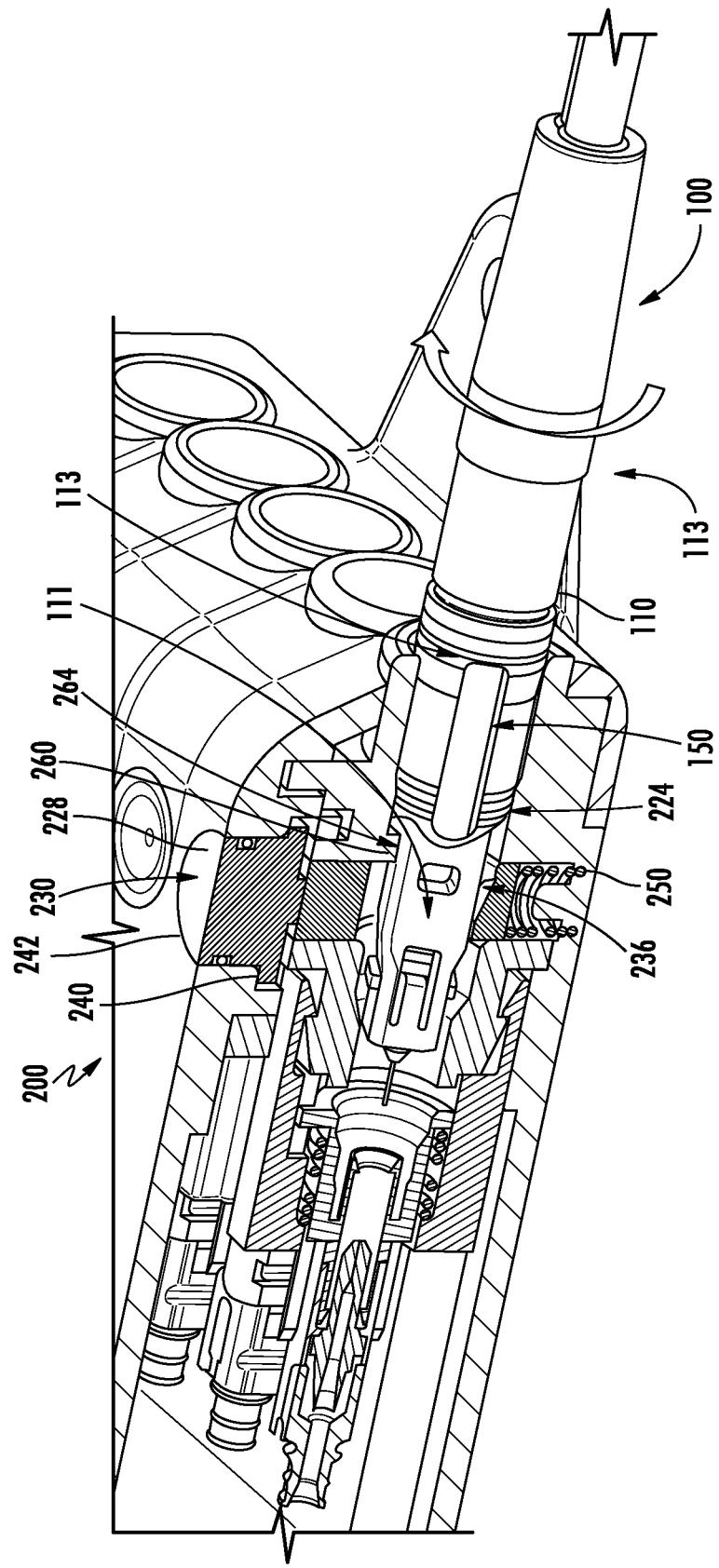
FIG. 24 schematically depicts the fiber optic connector further inserted within the optical connection port of the multiport assembly of FIG. 16, according to one or more embodiments shown and described herein.
Figure 25:
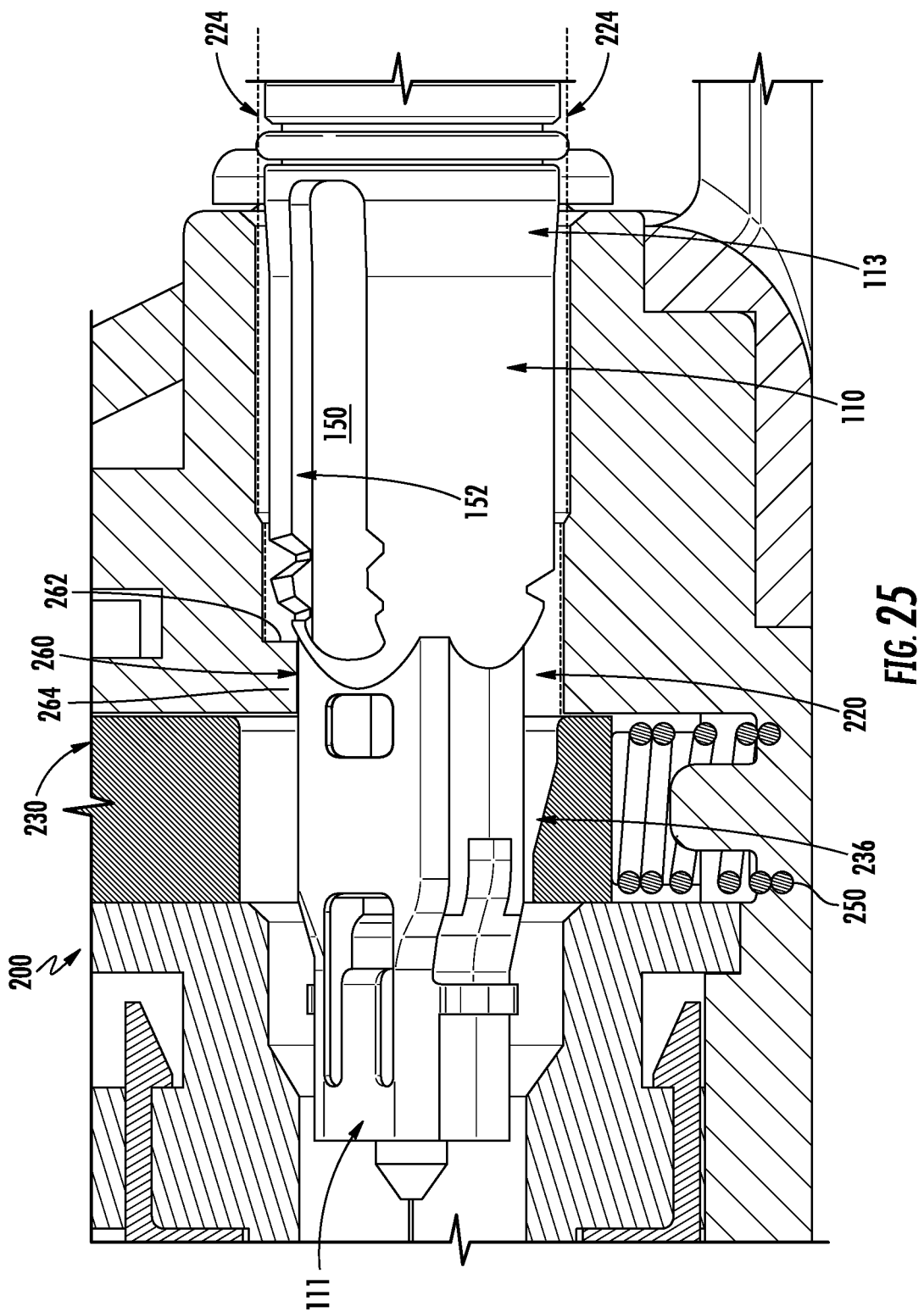
FIG. 25 schematically depicts a side cross-section view of the fiber optic connector inserted within the optical connection port of the multiport assembly of FIG. 16, according to one or more embodiments shown and described herein.

Referring collectively to FIGS. 24 and 25, the optical connector port 220 includes a rotationally discrete keying portion 260 extending inward into the connector insertion path 224. The rotationally discrete keying portion 260 comprises includes rotationally discrete contact surfaces, more particularly a forward-facing surface 262 that is oriented to face the open end of the connection port passageway 222, and one or more lateral-facing surfaces 264 that are configured to engage the contact surfaces 152 of the keying portion 150 of the connector housing 110. Through engagement with the contact surfaces 152 of the keying portion 150 of the connector housing 110, the lateral-facing surfaces 264 are structurally configured to inhibit rotation of the connector housing 110 when inserted into the connection port passageway 222. Each of the rotationally discrete contact surfaces of the keying portion 260 of the multiport assembly 200 have an unobstructed line of sight with an open end of the connection port passageway 222.

As shown in FIGS. 24 and 25, in some instances, the fiber optic connector 100 may be inserted to the connection port passageway 222 with the keying portion 150 of the connector housing 110 mis-aligned with the corresponding keying portion 260 of the connection port passageway 222. In the embodiment depicted in FIGS. 24 and 25, the keying portion 150 of the connector housing 110 includes a recessed portion of the connector housing and the keying portion 260 of the connection port passageway 222 extends inward into the connector insertion path 224. As such the keying portion 260 may mechanically interfere with portions of the connector housing 110 other than the keying portion 150 of the connector housing 110, preventing further insertion of the connector housing 110, as shown in FIGS. 24 and 25. Instead, the connector housing 110 must be rotated to align the keying portion 150 of the connector housing 110 with the keying portion 260 of the connection port passageway 222 to allow further insertion of the connector housing 110 into the connection port passageway 222. In some configurations rotational alignment of the keying portion 150 of the connector housing 110 with the keying portion 260 of the connection port passageway 222 may assist in maintaining a suitable optical connection between the optical fiber 12 (FIG. 3A) with an optical fiber positioned in the optical adapter 210. For example and without being bound by theory, in some configurations, signal loss between the optical fiber 12 (FIG. 3A) and an optical fiber positioned in the optical adapter 210 may depend on the rotational position of the optical fiber 12 (FIG. 3A) with respect to the optical fiber positioned in the optical adapter 210. As such, the optical fiber 12 (FIG. 3A) may be positioned within the connector housing 110 such that the optical fiber 12 is rotationally aligned with the optical fiber positioned in the optical adapter 210 when the keying portion 150 is aligned with the keying portion 260 of the connection port passageway 222.

As described above, in some embodiments, the keying portion 150 of the connector housing 110 includes a positive surface projection (see e.g., FIG. 14), as compared to the recessed keying portion 150 depicted in FIG. 25. In these embodiments, the keying portion 260 of the connection port passageway 222 may include a complementary recessed keying portion 260 that similarly restricts insertion of the connector housing 110 unless the keying portion 150 of the connector housing 110 is rotationally aligned with the keying portion 260 of the connection port passageway 222.

Figure 26:
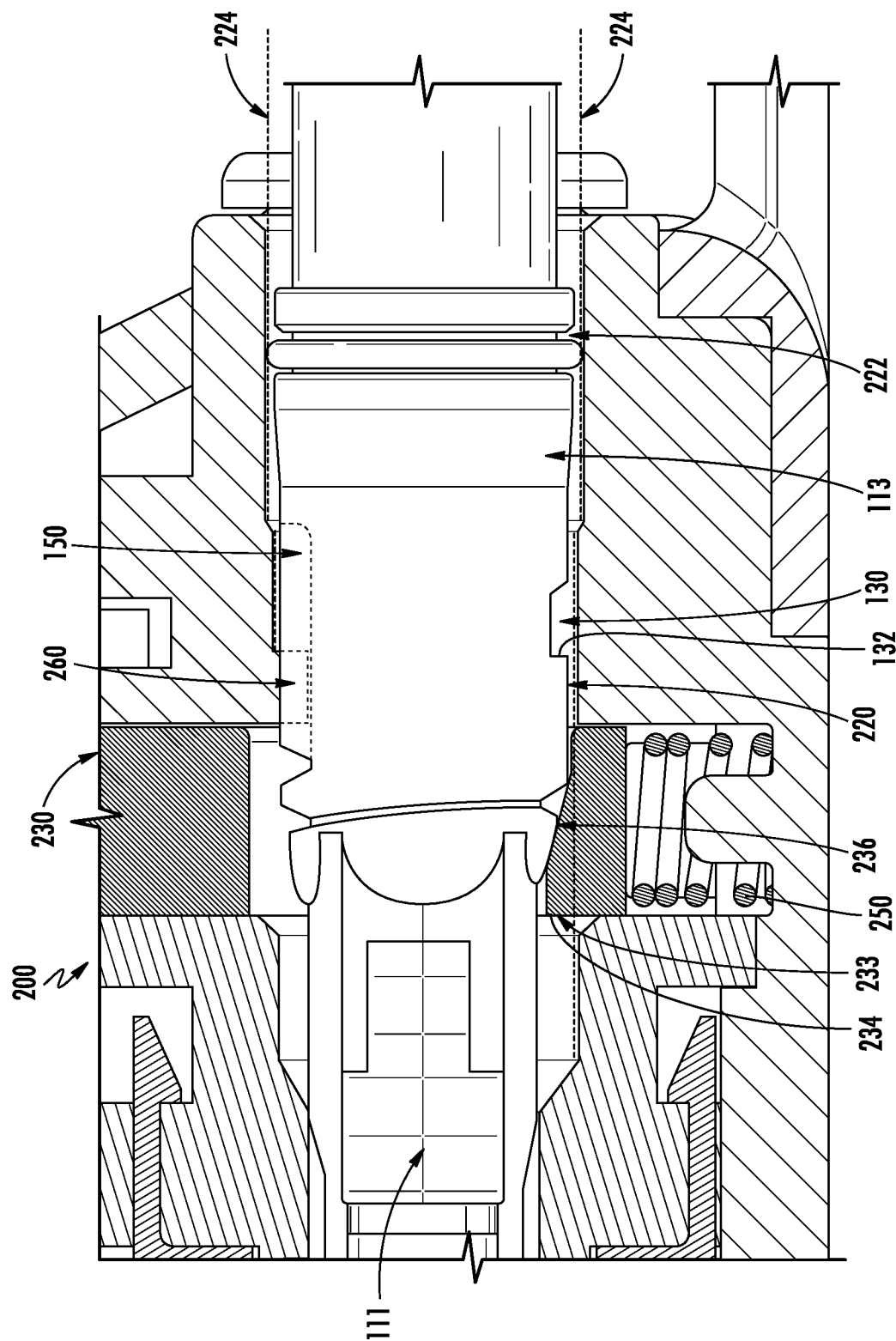
FIG. 26 schematically depicts the fiber optic connector engaging a push-button securing member of the multiport assembly of FIG. 16, according to one or more embodiments shown and described herein.

Referring to FIG. 26, with the keying portion 150 of the connector housing 110 aligned with the keying portion 260 of the connection port passageway 222, the connector housing of the fiber optic connector 100 may be further inserted into the connection port passageway 222. As the connector housing 110 of the fiber optic connector 100 is further inserted, the connector housing 110 contacts the ramp 236 of the push-button securing member 230. As described above, the ramp 236 is oriented to be upward and forward facing. As such, as the connector housing 110 is further inserted into the, axial force exerted on the ramp 236 as the connector housing 110 is inserted may be resolved into downward force applied to the push-button securing member 230. The downward force applied to the push-button securing member 230 moves the push-button securing member 230 downward in a vertical direction that is transverse to the connector insertion path 224, and the locking portion 233 including the connector engagement face 234 of the push-button securing member 230 may be moved out of the connector insertion path 224, thereby moving the push-button securing member 230 into the disengaged position. As described above, in embodiments, the resilient member 250 is engaged with the push-button securing member 230 and biases the push-button securing member 230 into the engaged position. Accordingly, in these embodiments, the biasing force of the resilient member 250 must be overcome to move the push-button securing member 230 into the disengaged position.

Figure 27:
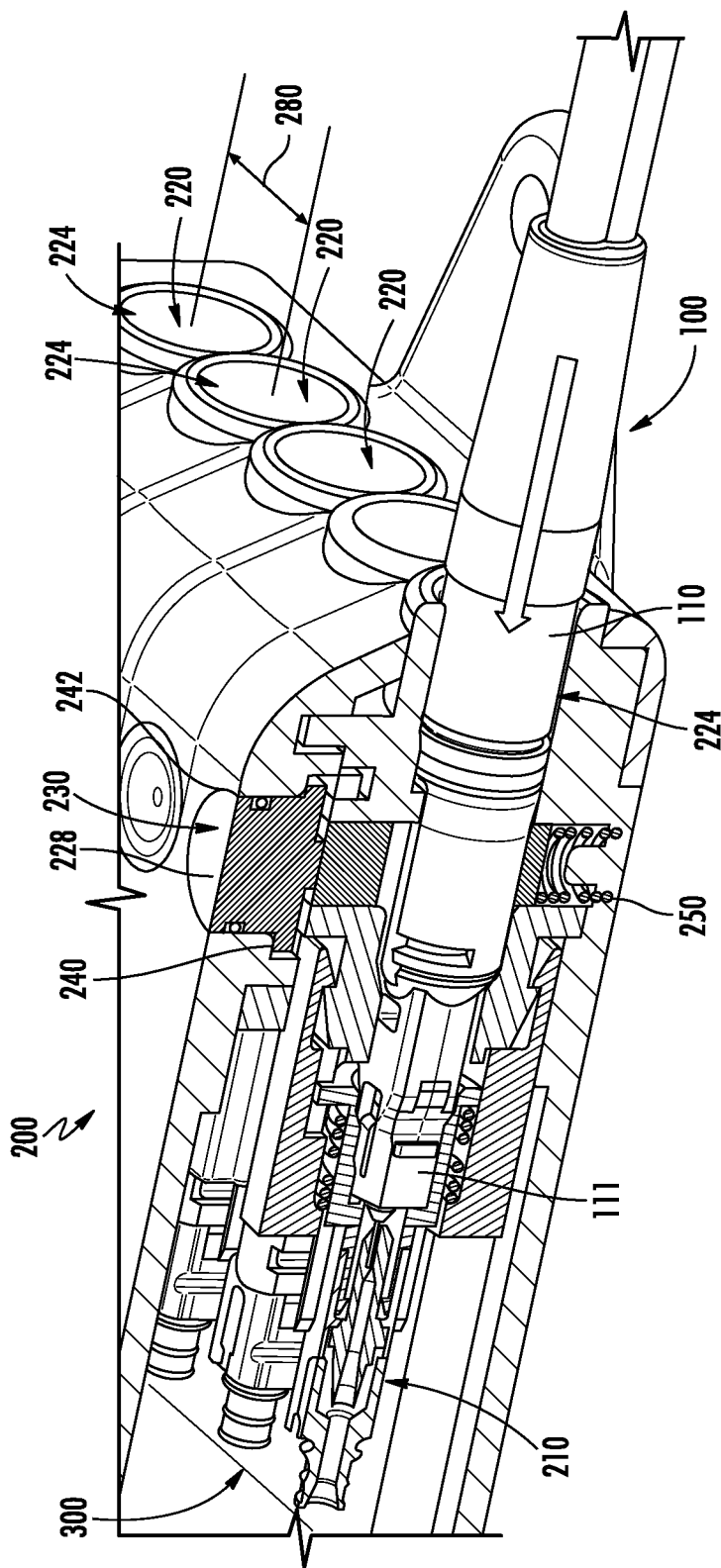
FIG. 27 schematically depicts the fiber optic connector fully inserted to the optical connection port of the multiport assembly of FIG. 16, according to one or more embodiments shown and described herein.

Referring to FIG. 27, when the fiber optic connector 100 is fully inserted to the connection port passageway 222, the front portion 111 of the connector housing 110 may be engaged with the optical adapter 210. Additionally, the push-button securing member 230 may be re-positioned back into the engaged position. More particularly, the port engagement face 132 (FIG. 26) of the connector housing 110 may be engaged with the connector engagement face 234 of the push-button securing member 230, and the ramp 236 (FIG. 26) of the push-button securing member 230 may be positioned within the locking portion recess 134 (FIG. 26) of the connector housing 110. Engagement between the connector engagement face 234 (FIG. 17) of the push-button securing member 230 (FIG. 17) with the port engagement face 132 (FIG. 17) of the connector housing 110 inhibits axial movement of the connector housing along the retracting direction of the fiber optic connector 100 with respect to the multiport assembly 200, selectively coupling the connector housing 110 to the multiport assembly 200. Further, the retention portion 240 of the push-button securing member 230 may strike and contact the shell 202 as the push-button securing member 230 is repositioned to the engaged position, which may produce an audible sound. A user inserting the connector housing 110 may utilize the auditory sound of the retention portion 240 hitting the shell 202 as confirmation that the connector housing 110 is fully inserted and is selectively coupled to the multiport assembly 200.

As best illustrated in the cross-section shown in FIG. 18, a gap may be positioned between the locking portion recess 134 of the connector housing and the ramp 236 of the push-button securing member 230, such that only the port engagement face 132 of the connector housing 110 contacts the push-button securing member 230. In this way, minimal vertical forces may be transmitted from the push-button securing member 230 to the connector housing 110, which may assist in maintaining alignment of the connector housing 110 with the optical adapter 210.

While in FIGS. 22-27, a single optical connector port 220 is shown in cross-section as described above, it should be understood that the other optical connector ports 220 of the multiport assembly 200 may be substantially the same. With the fiber optic connector 100 inserted into the optical connector port 220 and selectively coupled to the push-button securing member 230, the optical fiber 12 (FIG. 1) of the fiber optic connector 100 may be optically coupled to another optical fiber positioned within the optical adapter 210, forming a fiber optic junction 300. By moving from the engaged position to the disengaged position with the insertion of a fiber optic connector 100, and then back to the engaged position upon the full insertion of the fiber optic connector 100, a user may selectively couple the fiber optic connector 100 to the multiport assembly 200 with one hand. In this way, the multiport assembly 200 and the connector housing 110 of the present disclosure may provide a significant benefit over conventional port assemblies which may require the use of two hands to manipulate a bayonet connection, a locking nut connection, or the like.

Furthermore and referring to FIG. 27, the use of push-button securing members 230 that are selectively positioned within a connector insertion path 224 may allow a distance between adjacent optical connection ports 220 to be reduced as compared to conventional port assemblies. For example, some conventional port assemblies utilize bayonet connections and/or locking nut connections, each of which require connection components positioned radially outward of a connector insertion path. By contrast, the push-button securing members 230 of the present disclosure generally intersect the connector insertion paths 224, minimizing the need for connection components positioned outward of the connector insertion paths 224. As such, the distance between adjacent optical connection ports 220 may be reduced, allowing an increase in an overall density of optical connection ports 220 on the multiport assembly 200. For example, in the embodiment depicted in FIG. 27, adjacent optical connection ports 220 may be spaced apart by a distance 280 evaluated between central axes 282 extending along the connector insertion paths 224 of the optical connection ports 220. In embodiments, the distance 280 may be less than about 13 millimeters. Furthermore, while the embodiment depicted in FIG. 21 shows optical connection ports 220 extending across the multiport assembly 200 in a lateral direction, it should be understood that it is contemplated that multiport assemblies 200 according to the present disclosure maybe positioned in any suitable orientation with respect to one another, and may be positioned on top of one another in the vertical direction.

Referring again to FIG. 17, to remove the fiber optic connector 100 from the multiport assembly, the push-button securing member 230 is moved from the engaged position back into a disengaged position by moving the push-button securing member 230 downward in a direction that is transverse to the central axis 282 extending along the connector insertion path 224 (e.g., in the vertical direction as depicted). For example, the push-button securing members 230 may be moved to the disengaged position by depressing a top surface 228 of the push-button securing member 230 to overcome the biasing force of the resilient member 250.

In one embodiment, the push-button securing member may be repositioned into the disengaged position under a force exceeding a predetermined threshold between 5 newtons and 50 newtons applied to the push-button securing member 230 in a direction that is transverse to the axis extending along the corresponding connector insertion path 224. In another embodiment, the push-button securing member 230 may be repositioned into the disengaged position under a force exceeding a predetermined threshold between 20 newtons and 25 newtons applied to the push-button securing member 230 in a direction that is transverse to the axis extending along the corresponding connector insertion path 224.

In embodiments, each push-button securing member 230 is configured to permit forcible nondestructive disengagement of an external optical connector 100 from the locking portion 233 of the push-button securing member 230 upon application of a force on the external optical connector 100 in a direction along the central axis 282 extending along the corresponding connector insertion path 224. For example, in embodiments, the push-button securing members 230 are configured to be repositioned into the disengaged position upon the application of a force on the optical connector 100, transmitted to the push-button securing member 230 through the engagement between the connector engagement face 234 of the push-button securing member 230 and the port engagement face 132 of the connector housing 110. As described above, one or both of the connector engagement face 234 of the push-button securing member 230 and the port engagement face 132 of the connector housing 110 may be oriented at an angle with respect to the vertical direction as depicted (i.e., the port engagement face 132 of the connector housing at an angle from perpendicular with the longitudinal axis 114, and the connector engagement face 234 at an angle from perpendicular with respect to the connector insertion path 224). As such, a force applied to the connector housing 110 in an axial direction (i.e., along the connector insertion path 224) may be resolved into a vertical force applied to the push-button securing member 230 by the connector engagement face 234 of the push-button securing member 230 and/or the port engagement face 132 of the connector housing 110. The vertical force may reposition the push-button securing member 230 into the disengaged position.

Furthermore, as described above, the outer end 133 (FIG. 3) of the port engagement face 132 of the connector housing 110 and/or the outer end 235 (FIG. 20) of the connector engagement face 234 of the push-button securing member 230 include chamfered or rounded edges. The chamfered and/or rounded edges of the outer end 133 (FIG. 3) of the port engagement face 132 of the connector housing 110 and/or the outer end 235 (FIG. 20) of the connector engagement face 234 of the push-button securing member 230 may reduce point forces on the connector housing 110 and/or the push-button securing member 230 as the push-button securing member 230 is repositioned into the disengaged position. By reducing point forces on the connector housing 110 and/or the push-button securing member 230, breakage of the connector housing 110 and/or the push-button securing member 230 may be reduced.

In one embodiment, the plurality of push-button securing members 230 are each moved to the disengaged position upon the application upon the application of the force on the external optical connector 100 exceeding a predetermined threshold of between 20 newtons and 500 newtons, inclusive of the endpoints. In some embodiments, the plurality of push-button securing members 230 are each moved to the disengaged position upon the application of the force on the external optical connector 100 exceeding a predetermined threshold of 20 newtons and 25 newtons. As such, a fiber optic connector may be removed from the multiport assembly 200 upon the application of a predetermined force. This selective disengagement may assist in reducing damage to the multiport assembly 200 and/or the fiber optic connector 100, for example in instances when unanticipated or undesired forces are applied to the fiber optic connector 100.

The force required to reposition the plurality of push-button securing members 230 into the disengaged position is related to the relative orientation of the port engagement face 132 of the connector housing 110 and the connector engagement face 234 of the push-button securing member 230 and can be tailored as desired. For example, as described above, the port engagement face 132 is generally oriented to lie in a plane that intersects the longitudinal axis 114 at an angle that is 30 degrees or less from perpendicular, and is oriented to be rearward and outward facing. Increasing the angle from perpendicular of the port engagement face 132 with respect to the longitudinal axis 114 (e.g., orienting the port engagement face 132 to be more downward facing) may reduce the force required to remove the fiber optic connector 100, as more of the axial force on the connector housing 110 may be resolved into the vertical direction. Conversely, as the angle of the port engagement face 132 with respect to the longitudinal axis 114 approaches perpendicular, the force required to remove the fiber optic connector 100 will increase, as less of the axial force on the connector housing 110 is resolved into the vertical direction.

Similarly, as described above, the connector engagement face 234 of each of the push-button securing members 230 defines a plane that intersects the corresponding connector insertion path 224 at an angle that is less than 30 degrees from perpendicular, such that the connector engagement faces 234 face rearward and upward. Increasing the angle from perpendicular of the connector engagement face 234 with respect to the connector insertion path 224 (e.g., orienting connector engagement face 234 to be more upward facing) may reduce the force required to remove the fiber optic connector 100, as more of the axial force on the connector housing 110 may be resolved into the vertical direction. Conversely, as the angle of the connector engagement face 234 with respect to the connector insertion path 224 approaches perpendicular, the force required to remove the fiber optic connector 100 will increase, as less of the axial force on the connector housing 110 is resolved into the vertical direction. In this way the orientation of the port engagement face 132 of the connector housing 110 and the connector engagement face 234 of the push-button securing members 230 may be tailored to achieve a desired force required to remove the connector housing 110 from the multiport assembly 200.

In some embodiments as described above, the port engagement face 132 may include a locking face 135 (FIG. 3B) and a release face 137 (FIG. 3B). In these embodiments, the locking face 135 (FIG. 3B) may be configured to engage a connector engagement face 234 of a push-button securing member 230 that is oriented orthogonal to the connector insertion path 224, thereby securing the connector housing 110 such that the connector housing 110 cannot be forcibly removed from the multiport assembly 200. In particular, as neither the connector engagement face 234 of the push-button securing member 230 or the locking face 135 of the port engagement face 132 resolve axial force applied to the connector housing into a vertical direction (i.e., as both the locking face 135 (FIG. 3B) and the connector engagement face 234 of the push-button securing member 230 are oriented in the vertical direction), the connector housing 110 may not be removed by axial force applied to the connector housing 110. In other configurations, the release face 137 (FIG. 3B) may be configured to engage a connector engagement face 234 of a push-button securing member 230, such that axial force applied to the connector housing 110 may resolve into a vertical force, and the connector housing may be forcibly removed from the multiport assembly as described above. Accordingly, connector housings 110 including the port engagement face 132 with both the locking face 135 (FIG. 3B) and the release face 137 (FIG. 3B) may selectively be removable from multiport assemblies 200 including push-button securing members 230 that engage the release face 137 (FIG. 3B), while may be fixedly attached to multiport assemblies 200 including push-button securing members 200 that engage the locking face 135 (FIG. 3B).

Figure 28:
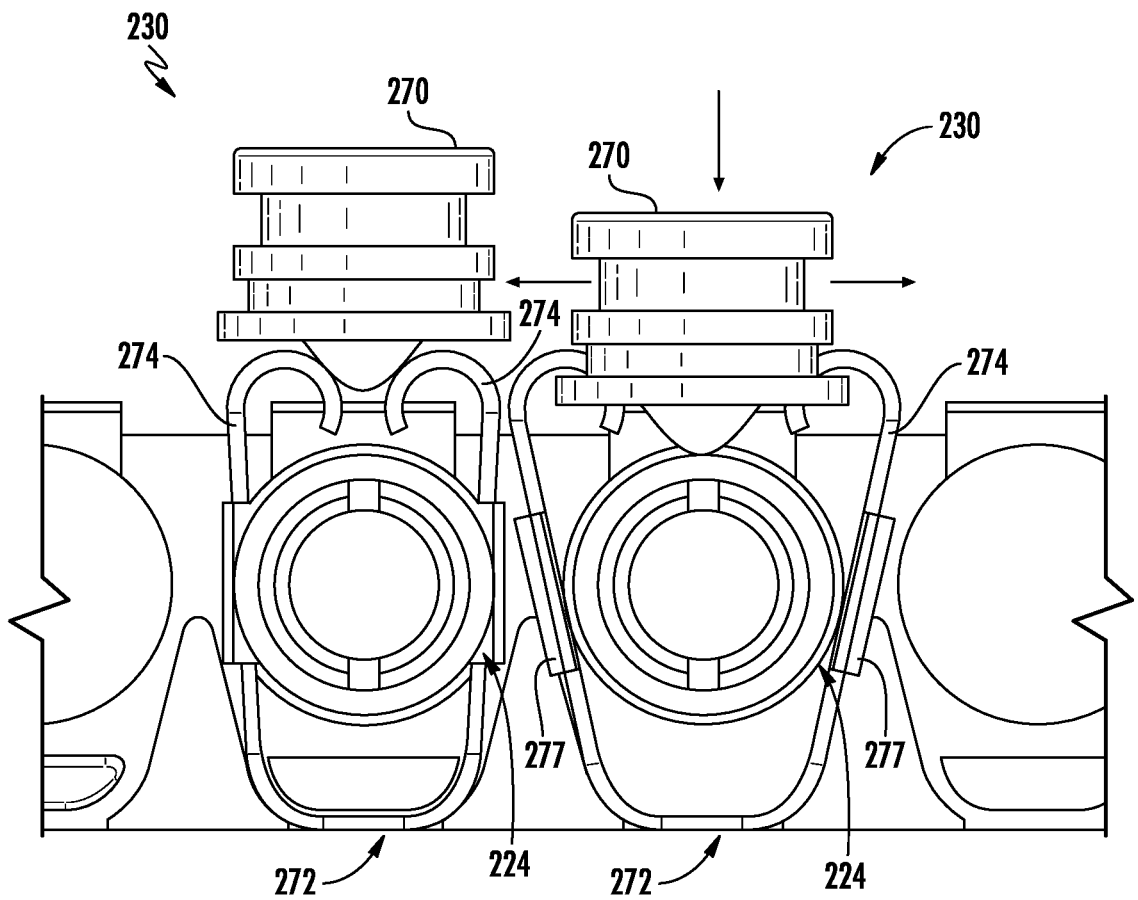
FIG. 28 schematically depicts a front view of another push-button securing member according to one or more embodiments shown and described herein.

Referring now to FIG. 28, another embodiment of a push-button securing member 230 is schematically depicted. In the embodiment depicted in FIG. 28, the push-button securing member 230 includes a push-button 270 and a securing member 272 including a pair of opposing arms 274 that are selectively deformable between the engaged position and the disengaged position, in and out of the connector insertion path 224, respectively. In the embodiment depicted in FIG. 28, the pair of opposing arms 274 are elastically deformable in an outward direction from the connector insertion path 224 upon the depression of the push-button 270. In some configurations, the opposing arms 274 are configured to engage a concave locking portion 130 (FIG. 15) of a connector housing 110.

Figure 29:
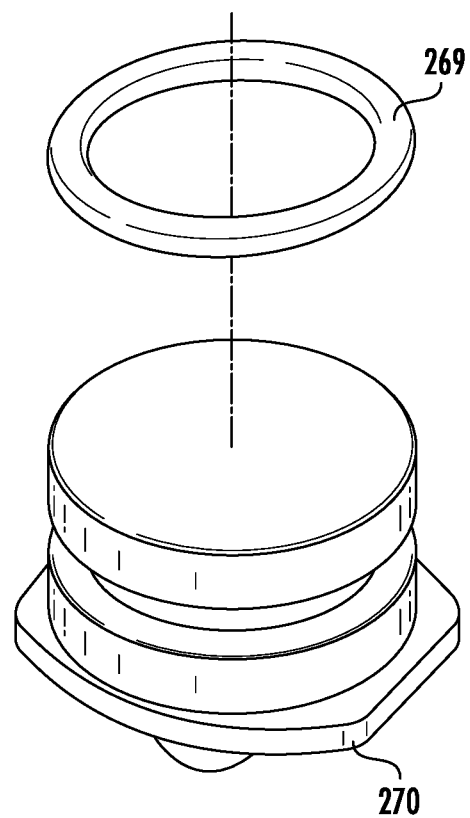
FIG. 29 schematically depicts a top view of a push-button of the push-button securing member of FIG. 28, according to one or more embodiments shown and described herein.
Figure 30:
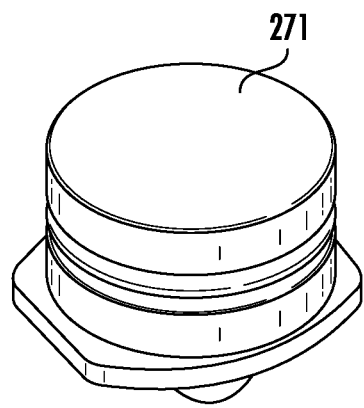
FIG. 30 schematically depicts another top view of the push-button of the push-button securing member of FIG. 28 with an o-ring seated to the push-button, according to one or more embodiments shown and described herein.
Figure 31:
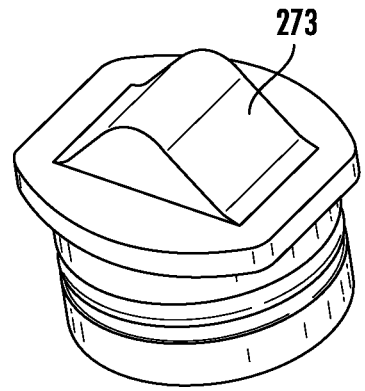
FIG. 31 schematically depicts a bottom view of the push-button of FIG. 29, according to one or more embodiments shown and described herein.

Referring collectively to FIGS. 29-31, top perspective views and a bottom perspective view of the push-button 270 are schematically depicted respectively. In some embodiments, such as the embodiments depicted in FIGS. 29-31, the push-button 270 includes a planar top surface 271 and optionally includes an o-ring 269 that is seated on the push-button 270. Referring particularly to FIG. 31, in embodiments the push-button 270 includes a wedge 273 positioned on a bottom surface that is configured to engage and reposition the opposing arms 274 (FIG. 28) into the disengaged position.

Figure 32:
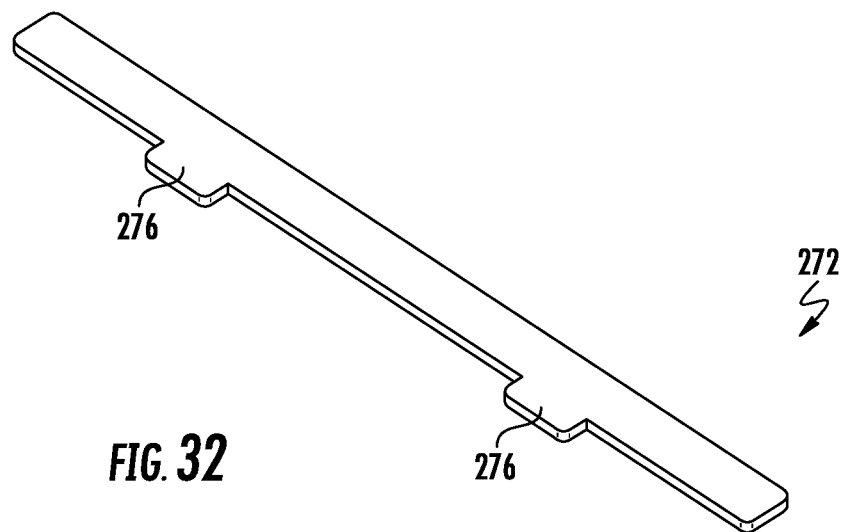
FIG. 32 schematically depicts a blank for making the push-button securing member of FIG. 28, according to one or more embodiments shown and described herein.
Figure 33:
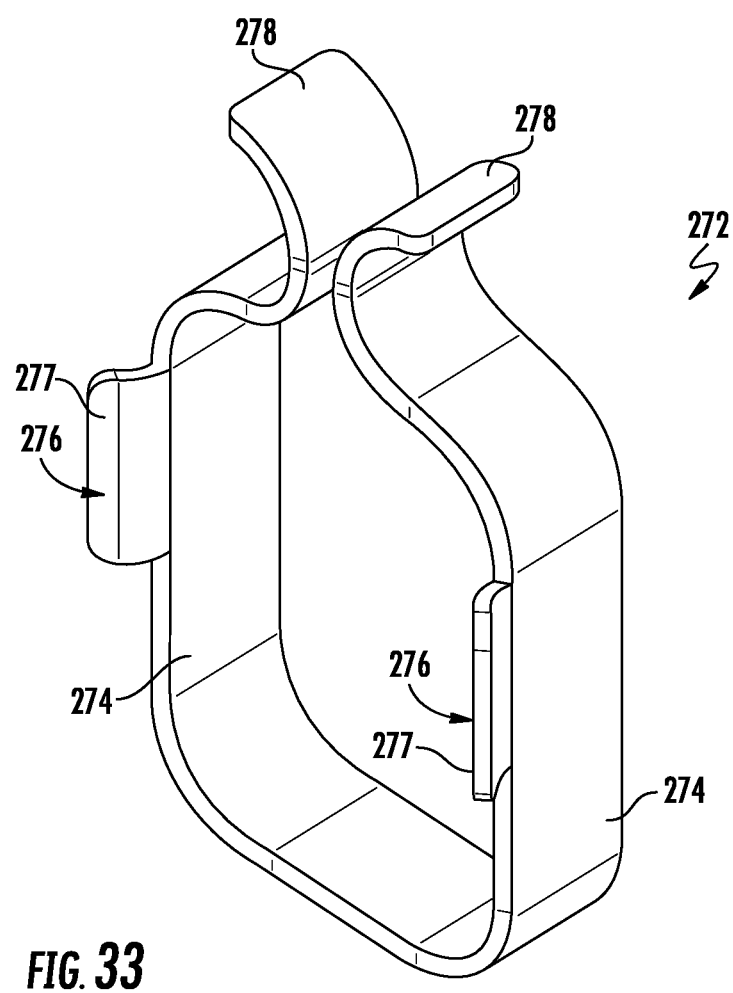
FIG. 33 schematically depicts the push-button securing member of FIG. 28 in isolation, according to one or more embodiments shown and described herein.

Referring to FIGS. 32 and 33, a perspective view of a blank that may be used to form the securing member 272 and a perspective view of a formed securing member 272 are depicted, respectively. The securing member 272 includes the opposing arms 274 that are configured to engage and retain a connector housing 110 (FIG. 27). The securing member 272 further includes tabs 276 that are positioned on and extend outward from the opposing arms 274. Each of the tabs 276 include a flange 277 oriented transverse to the connector insertion path 224 (FIG. 28). The flanges 277 may be configured to engage the connector housing 110 (FIG. 27) and move the opposing arms 274 outward as the connector housing 110 (FIG. 27) is inserted along the connector insertion path 224. The securing member 272 further includes push-button flanges 278 positioned at a top end of the securing member 272. The push-button flanges 278 are oriented to face upward and are configured to engage the push-button 270, such that when the push-button 270 is depressed, the opposing arms 274 move outward to the disengaged position. In embodiments, the securing member 272 may be selected such that the opposing arms 274 may selectively deform outward the application of the force on the external optical connector 100 exceeding a predetermined threshold between 20 newtons and 25 newtons.

Figure 34:
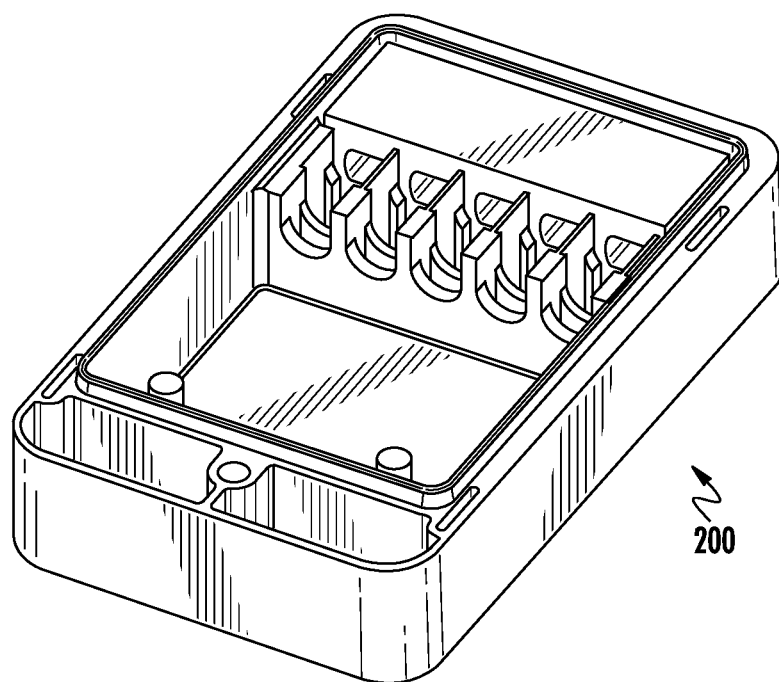
FIG. 34 schematically depicts another multiport assembly including a push-button securing member, according to one or more embodiments shown and described herein.
Figure 35:
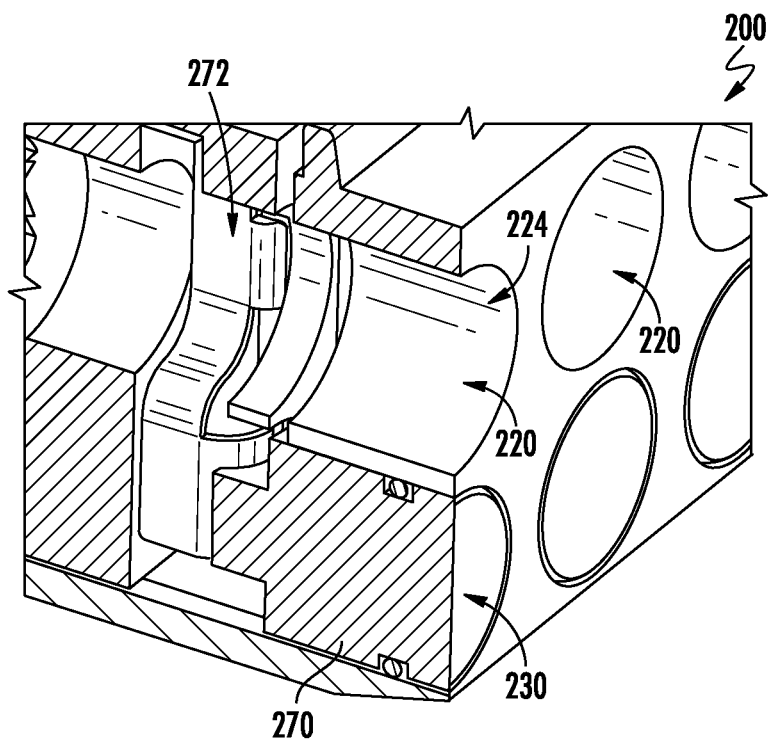
FIG. 35 schematically depicts a cross section of the multiport assembly and push-button securing member of FIG. 34, according to one or more embodiments shown and described herein.
Figure 36:
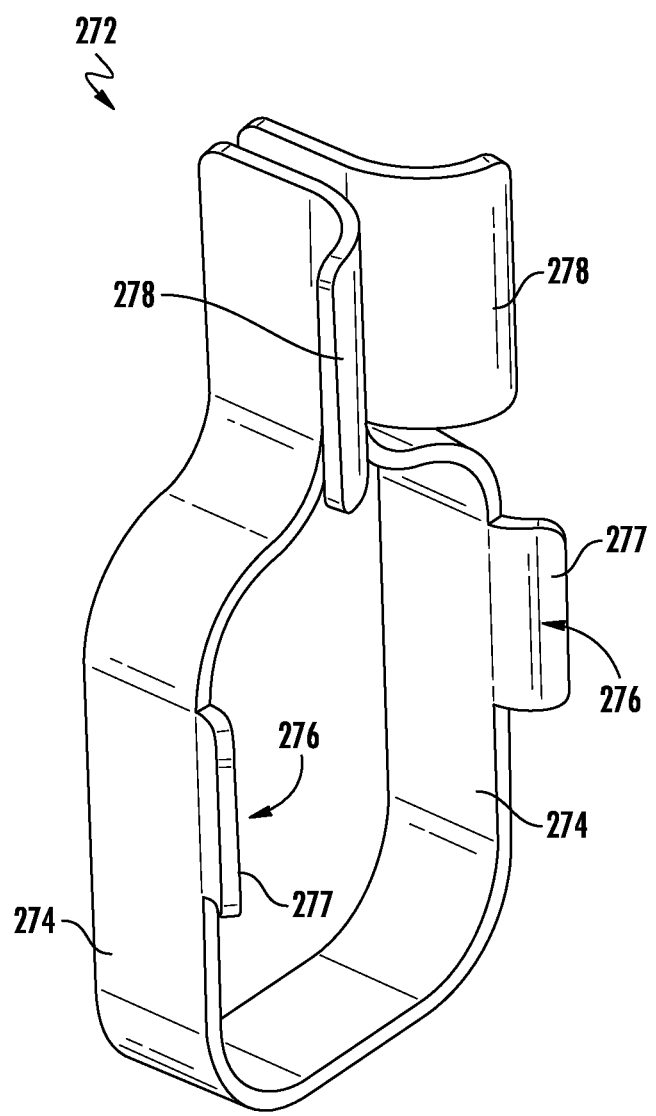
FIG. 36 schematically depicts the push-button securing member of FIG. 34 in isolation, according to one or more embodiments shown and described herein.

Referring to FIGS. 34-36, another embodiment of the push-button securing member 230 is schematically depicted. Like the embodiment described above with respect to FIGS. 28-33, the push-button securing member 230 includes a securing member 272 with selectively deformable arms 274, each having tabs 276 with flanges 277 that are oriented transverse to the connector insertion path 224. However, in this embodiment, the push-button flanges 278 are oriented to face outward and in the same direction as the flanges 277 on the opposing arms 274. This allows for the push-button 270 to be positioned in-line with the connector insertion path 224, as depicted in FIG. 35.

Accordingly, it should now be understood that embodiments described herein include fiber optic connectors including connector housings having a locking portion that selectively engages a push-button securing member of a multiport assembly to selectively couple the fiber optic connector to the multiport assembly. The locking portion of the connector housing and/or the push-button securing member of the multiport assembly may be configured to allow forcible, non-destructive disengagement of the connector housing from the multiport assembly upon the application of a predetermined force to the connector housing. In this way, damage to the multiport assembly and/or the fiber optic connector resulting from unexpected or unintended forces applied to the connector housing may be minimized.

In embodiments, the push-button securing members may generally intersect a connection port passageway of the multiport assembly, which may reduce the need for securing features positioned on the perimeter of the connection port passageway. By reducing the need for securing features positioned on the perimeter of the connection port passageway, adjacent connection port passageways on the multiport assembly may be positioned closer to one another such that a greater number of connection port passageways to be included in a multiport assembly without increasing the overall size of the multiport assembly. Furthermore, the push-button securing members may be configured to automatically engage a connector housing upon the full insertion of the connector housing to the connection port passageway, such that a user may selectively couple the connector housing to the multiport assembly with one hand, thereby simplifying the connection of the connector housing to the multiport assembly. The connector housings may further include a keying portion that selectively engages a corresponding keying portion of the multiport assembly to ensure and maintain the rotational orientation of the fiber optic connector with the multiport assembly.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

We claim:

1. A fiber optic connector, comprising:
   a ferrule comprising an optical fiber bore; and
   a connector housing comprising:
      a rotationally discrete keying portion defined on an outer surface of the connector housing, wherein the rotationally discrete keying portion comprises a recessed portion of the connector housing with an unobstructed line of sight from the rotationally discrete keying portion to a leading edge plane of the connector housing along an advancing direction of the fiber optic connector;
      a front portion of the connector housing comprising a rectangular cross-section having planar sides, and a rear portion of the connector housing comprising a curved outer surface; and
      a rotationally discrete locking portion defined on the outer surface of the connector housing that interrupts the nominal housing portion as a negative cut-out, the rotationally discrete locking portion comprising a port engagement face and a locking portion recess positioned rearward of the port engagement face.

2. The fiber optic connector of claim 1, wherein the port engagement face is rearwardly facing.

3. The fiber optic connector of claim 2, wherein the locking portion recess is obstructed from the leading edge plane of the connector housing along the advancing direction of the fiber optic connector.

4. The fiber optic connector of claim 1, wherein the keying portion comprises a pair of rotationally discrete contact surfaces that are accessible without obstruction from the leading edge plane of the connector housing.

5. The fiber optic connector of claim 4, wherein each of the rotationally discrete contact surfaces of the keying portion lie in planes that extend orthogonally to a plane of the port engagement face.

6. The fiber optic connector of claim 4, wherein each of the rotationally discrete contact surfaces of the keying portion lie in planes that intersect the port engagement face.

7. The fiber optic connector of claim 1, wherein the port engagement face of the locking portion is formed from an edge-to-edge cross sectional cut-out of the connector housing.

8. The fiber optic connector of claim 7, wherein a rotational arc θ2 circumscribed by the edge-to-edge cross sectional cut-out forming the port engagement face is less than 90 degrees.

9. The fiber optic connector of claim 1, wherein the keying portion of the connector housing extends closer to the front portion of the connector housing than does the locking portion of the connector housing.

10. The fiber optic connector of claim 1, wherein:
    the keying portion comprises a pair of rotationally discrete contact surfaces that are accessible without obstruction from the leading edge plane of the connector housing;
    each of the rotationally discrete contact surfaces of the keying portion lie in planes that extend parallel to a longitudinal axis of the connector housing; and
    the port engagement face of the locking portion lies in a plane that is intersected by the longitudinal axis of the connector housing.

11. The fiber optic connector of claim 1, wherein:
    the keying portion and the locking portion circumscribe respective rotational arcs θ1, θ2 relative to a longitudinal axis of the connector housing; and
    the rotational arcs θ1, θ2 are mutually exclusive such that the keying portion and the locking portion are defined on different surface portions of the outer surface of the connector housing.

12. The fiber optic connector of claim 1, wherein a rotational arc θ1 circumscribed by a width of the keying portion relative to a longitudinal axis of the connector housing is less than a rotational arc θ2 circumscribed by the width of the locking portion relative to the longitudinal axis of the connector housing.

13. The fiber optic connector of claim 1, wherein:
    the connector housing further comprises a transition region between the front portion of the connector housing and the locking portion of the connector housing; and
    the keying portion of the connector housing extends at least partially into the transition region of the connector housing.

14. The fiber optic connector of claim 13, wherein the keying portion extends only partially into the transition region of the connector housing.

15. The fiber optic connector of claim 13, wherein a length of the keying portion exceeds a length of the transition region along a direction aligned with a longitudinal axis of the connector housing.

16. The fiber optic connector of claim 13, wherein a length of the keying portion exceeds a length of the front portion of the connector housing along a direction parallel to a longitudinal axis of the connector housing.

17. The fiber optic connector of claim 1, wherein the port engagement face of the locking portion, is formed from at least one flat surface.

18. The fiber optic connector of claim 1, wherein the rotationally discrete locking portion is defined on the outer surface of the connector housing as a cut-out comprising:
- a rearward-facing cut-out surface extending along a portion of a plane intersecting the longitudinal axis of the connector housing at an acute angle $\alpha_1$; and
- a forward facing cut-out surface intersecting the rearward-facing cut-out surface and extending along a portion of a plane intersecting the longitudinal axis of the connector housing at an angle $\alpha_2$ that is larger than the acute angle $\alpha_1$.

19. The fiber optic connector of claim 18, wherein $\alpha_2 \leq 180°$ and $\alpha_1$ is betweein 60° and 90°.

20. The fiber optic connector of claim 1, wherein the port engagement face defines a plane that intersects the longitudinal axis at an angle that is less than 30 degrees from perpendicular.

21. The fiber optic connector of claim 1, the locking portion recess comprises a planar surface that is oriented transverse to the port engagement face and that extends at least partially across the outer surface of the connector housing.

22. The fiber optic connector of claim 1, wherein the rotationally discrete keying portion comprises a pair of rotationally discrete contact surfaces that interrupt the nominal housing portion as a negative cut-out.

23. A method for connecting a fiber optic connector to a multiport assembly, the method comprising:
- providing a fiber optic connector comprising a ferrule and a connector housing, wherein the ferrule comprises an optical fiber bore and the connector housing comprises:
- a rotationally discrete keying portion defined on the outer surface of the connector housing, and
- a rotationally discrete locking portion defined on the outer surface of the connector housing and interrupts the nominal housing portion as a negative cut-out, the locking portion comprising a port engagement face, wherein the rotationally discrete locking portion comprises a locking portion recess positioned rearward of the port engagement face;
- advancing the fiber optic connector along the advancing direction into an optical connector port of a multiport assembly comprising at least one optical adapter;
- aligning the rotationally discrete keying portion of the connector housing with a complementary rotationally discrete keying portion associated with the optical connector port to permit the rotationally discrete locking portion of the connector housing to engage a rotationally discrete locking portion of a push-button securing member associated with the optical connector port; and
- engaging the rotationally discrete locking portion of the connector housing with the rotationally discrete locking portion of the push-button securing member associated with the optical connector port.

24. The method of claim 23, wherein the port engagement face is rearwardly facing.

25. The method of claim 23, wherein the keying portion associated with the optical connector port comprises at least one rotationally discrete contact surface in unobstructed line of sight with an open end of a connection port passageway of the optical connector port.

26. The method of claim 23, wherein engaging the rotationally discrete locking portion of the connector housing with the rotationally discrete locking portion of the push-button securing member is subsequent to aligning the rotationally discrete keying portion of the connector housing with the complementary rotationally discrete keying portion associated with the optical connector port.

* * * * *